United States Patent
Philipp

(10) Patent No.: US 7,825,905 B2
(45) Date of Patent: Nov. 2, 2010

(54) ANISOTROPIC TOUCH SCREEN ELEMENT

(75) Inventor: Harald Philipp, Southampton (GB)

(73) Assignee: Atmel Corporation, San Jose, CA (US)

( * ) Notice: Subject to any disclaimer, the term of this patent is extended or adjusted under 35 U.S.C. 154(b) by 882 days.

(21) Appl. No.: 11/422,799

(22) Filed: Jun. 7, 2006

(65) Prior Publication Data

US 2006/0207806 A1    Sep. 21, 2006

Related U.S. Application Data

(63) Continuation-in-part of application No. 10/916,759, filed on Aug. 12, 2004, now abandoned.

(30) Foreign Application Priority Data

Aug. 21, 2003  (GB) .................................. 0319714.2

(51) Int. Cl.
*G06F 3/041* (2006.01)
(52) U.S. Cl. ..................................... 345/173; 178/18.05
(58) Field of Classification Search ................. 345/173, 345/174, 175; 341/33, 34; 178/18.01, 18.05, 178/158.03
See application file for complete search history.

(56) References Cited

U.S. PATENT DOCUMENTS

| | | | |
|---|---|---|---|
| 2,338,949 A | 1/1944 | Kuepfmueller et al. | |
| 2,925,467 A | 2/1960 | Becker | |
| 3,699,439 A | 10/1972 | Turner | |
| 3,921,166 A | 11/1975 | Volpe | |
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,622,437 A * | 11/1986 | Bloom et al. ............. | 178/18.05 |
| 4,649,232 A | 3/1987 | Nakamura et al. | |
| 4,650,926 A | 3/1987 | Nakamura et al. | |

(Continued)

FOREIGN PATENT DOCUMENTS

DE    203719 C    10/1908

(Continued)

OTHER PUBLICATIONS

Quantum Research Group Ltd (UK), QT11O, QTouck (TM) Sensor IC, 1999, QRG Ltd, Hamble UK.

(Continued)

*Primary Examiner*—Chanh Nguyen
*Assistant Examiner*—Pegeman Karimi
(74) *Attorney, Agent, or Firm*—Schwegman, Lundberg & Woessner, P.A.

(57) ABSTRACT

A touch sensitive position sensor for detecting the position of an object in two dimensions is described. The position sensor has first and second resistive bus-bars spaced apart with an anisotropic conductive area between them. Electric currents induced in the anisotropic conductive area by touch or proximity flow preferentially towards the bus-bars to be sensed by detection circuitry. Because induced currents, for example those induced by drive circuitry, flow preferentially along one direction, pin-cushion distortions in position estimates are largely constrained to this single direction. Such one-dimensional distortions can be corrected for very simply by applying scalar correction factors, thereby avoiding the need for complicated vector correction.

10 Claims, 15 Drawing Sheets

U.S. PATENT DOCUMENTS

| | | | |
|---|---|---|---|
| 4,678,869 A | | 7/1987 | Kable |
| 4,680,430 A | | 7/1987 | Yoshikawa et al. |
| 4,686,332 A | | 8/1987 | Greanias et al. |
| 4,733,222 A | | 3/1988 | Evans |
| 4,822,957 A | * | 4/1989 | Talmage et al. .......... 178/18.05 |
| 4,827,084 A | | 5/1989 | Yaniv et al. |
| 4,963,702 A | * | 10/1990 | Yaniger et al. ................ 178/28 |
| 5,101,081 A | | 3/1992 | Drumm |
| 5,149,919 A | | 9/1992 | Greanias et al. |
| 5,157,227 A | | 10/1992 | McDermott et al. |
| 5,181,030 A | | 1/1993 | Itaya et al. |
| 5,305,017 A | | 4/1994 | Gerpheide |
| 5,381,160 A | | 1/1995 | Landmeier |
| 5,438,168 A | | 8/1995 | Wolfe et al. |
| 5,455,574 A | * | 10/1995 | Itaya et al. .................... 341/20 |
| 5,457,289 A | | 10/1995 | Huang et al. |
| 5,463,388 A | | 10/1995 | Boie et al. |
| 5,682,032 A | | 10/1997 | Philipp |
| 5,730,165 A | | 3/1998 | Philipp |
| 5,790,106 A | | 8/1998 | Hirano et al. |
| 5,815,141 A | * | 9/1998 | Phares ........................ 345/173 |
| 5,818,430 A | | 10/1998 | Heiser |
| 5,844,506 A | | 12/1998 | Binstead |
| 5,898,426 A | | 4/1999 | Kim |
| 5,914,465 A | | 6/1999 | Allen et al. |
| 5,940,065 A | * | 8/1999 | Babb et al. .................. 345/178 |
| 5,945,639 A | | 8/1999 | Partow et al. |
| 6,016,140 A | | 1/2000 | Blouin et al. |
| 6,137,427 A | | 10/2000 | Binstead |
| 6,177,918 B1 | * | 1/2001 | Colgan et al. ................ 345/87 |
| 6,208,332 B1 | | 3/2001 | Ikegami |
| 6,239,790 B1 | | 5/2001 | Martinelli et al. |
| 6,288,707 B1 | | 9/2001 | Philipp |
| 6,429,846 B2 | | 8/2002 | Rosenberg et al. |
| 6,452,514 B1 | | 9/2002 | Philipp |
| 6,466,036 B1 | | 10/2002 | Philipp |
| 6,504,530 B1 | | 1/2003 | Wilson et al. |
| 6,506,983 B1 | | 1/2003 | Wilson et al. |
| 6,535,200 B2 | | 3/2003 | Philipp |
| 6,670,949 B1 | * | 12/2003 | Ahn et al. .................... 345/173 |
| 6,933,931 B2 | * | 8/2005 | Lubarsky et al. ............ 345/174 |
| 7,068,418 B2 | * | 6/2006 | Kawase ....................... 359/296 |
| 7,180,508 B2 | * | 2/2007 | Kent et al. ................... 345/178 |
| 2002/0180578 A1 | | 12/2002 | Sandbach |
| 2003/0132922 A1 | | 7/2003 | Philipp |
| 2005/0041018 A1 | | 2/2005 | Philipp |
| 2006/0207806 A1 | | 9/2006 | Philipp |

FOREIGN PATENT DOCUMENTS

| | | |
|---|---|---|
| JP | 01091350 | 4/1989 |
| JP | 2000513433 | 10/2000 |
| WO | WO-9734273 A1 | 9/1997 |
| WO | WO-2005020056 A1 | 3/2005 |

OTHER PUBLICATIONS

Quantum Research Group Ltd (UK), QProx QT 310, Programmable Capacitance Sensor IC, 2002, QRG Ltd, Hamble UK.

"PCT International Search Report in PCT/GB2004/003437, mailed Nov. 8, 2004", 2 pages.

"Japanese Application Serial No. 2006-523671, Office Action Mailed on Mar. 17, 2010".

* cited by examiner

ANISOTROPIC TOUCH SCREEN ELEMENT

This application is a Continuation In Parts of application 10/916,759 filed on Aug. 12, 2004 now abandoned.

BACKGROUND OF THE INVENTION

The invention pertains to 2-dimensional touch sensing surfaces operable by a human finger, or a stylus. Example devices include touch screens and touch pads, particularly those over LCDs, CRTs and other types of displays, or pen-input tablets, or encoders used in machinery for feedback control purposes. Descriptions of pen or touch input to a machine date back to at least 1908, as embodied in patent DE 203,719.

Touch screens and pointing devices have become increasingly popular and common not only in conjunction with personal computers but also in all manner of other appliances such as personal digital assistants (PDAs), point of sale (POS) terminals, electronic information and ticketing kiosks, kitchen appliances and the like. These devices are evolving continuously into lower priced products and as a result, there is a need for ever lower production cost while maintaining high levels of quality and robustness. Capacitive touch screens in particular are prized for their robustness against damage, but suffer from high costs and the need for exotic construction materials.

The term 'two-dimensional capacitive transducer' or '2DCT' will be used throughout to refer to touch screens, touch sensing pads, proximity sensing areas, display overlay touch screens over LCD, plasma, or CRT screens or the like, position sensing for mechanical devices or feedback systems, or other types of control surfaces without limitation, having a surface or volume capable of reporting at least a 2-dimensional coordinate, Cartesian or otherwise, related to the location of an object or human body part, by means of a capacitance sensing mechanism.

The term 'two-dimensional resistive transducer' or '2DRT' will be used throughout to refer to touch screens or pen input devices based on purely galvanic principles, and known in the industry generically and primarily as 'resistive touch screens'.

The term '2DxT' refers to elements of either the 2DCT or 2DRT type.

The term 'touch' throughout means touch or proximity by a human body part or mechanical component of sufficient capacitive signal strength to generate a desired output. In the sense of 'proximity', touch can also mean to 'point' at a 2DCT without making physical contact, where the 2DCT responds to the capacitance from the proximity of the object sufficient to react properly.

The term 'element' throughout refers to the active sensing element of a 2DCT or 2DRT. The term 'electrode' refers to a connection point at the periphery of the element.

The term 'stripe' refers to an electrical line conductor that is a component part of an element and which has two ends. A stripe can be a wire. A stripe can have substantial galvanic resistance by intent, whereas a wire has minimal resistance. If the element of which it is a part is physically curved, the stripe would also be physically curved.

The term 'pin cushion' refers to any distortion of the signal from a 2DCT whether parabolic, barrel, or other form of 2D dimensional aberration.

Many types of 2DCT are known to suffer from geometric distortion characterized as 'pin cushion' or 'hyperbolic' or 'parabolic', whereby the reported coordinate of touch is in error due to electrical effects on the sensing surface. These effects are described in more depth in various other patents for example in Pepper U.S. Pat. No. 4,198,539, incorporated by reference. An excellent summary of the known causes, solutions, and problems of the solutions to geometric distortion can be found in a reading of Babb et al, in U.S. Pat. No. 5,940,065, and U.S. Pat. No. 6,506,983, incorporated by reference. U.S. Pat. No. 5,940,065 describes succinctly the two major classes of correction: 1) Electromechanical methods involving design of or modification to the sensing surface or the connecting electrodes; 2) Modeling methods using mathematical algorithms to correct the distortions.

Electromechanical Methods

Edge Manipulation of Planar Element: Küpfmüller et al in U.S. Pat. No. 2,338,949 (filed 1940) solve the problem of edge distortion in a 2DRT electrograph using very long rectangular tails in X and Y surrounding a small usable area Küpfmüller takes the further approach of slotting the four tails into stripes; these stripes do not intrude on the user input area but do act to raise the resistance to current flow in an anisotropic manner along sides parallel to current flow. This idea reappears in slightly different form in Yaniv et al, U.S. Pat. No. 4,827,084, nearly 50 years later. Küpfmüller remains the most similar prior art to the instant invention.

Becker in U.S. Pat. No. 2,925,467 appears the first to describe a 2DRT electrograph whereby nonlinear edge effects are eliminated via the use of a very low resistance edge material relative to the sheet resistance of the element proper. This method can also be used to construct a 2DCT.

Pepper, in patents U.S. Pat. No. 4,198,539, U.S. Pat. No. 4,293,734, and U.S. Pat. No. 4,371,746 describes methods of linearizing a 2DCT by manipulating the edge resistance structure of the element.

Talmage, in U.S. Pat. No. 4,822,957 describes a similar edge pattern as Pepper in conjunction with a 2DRT element and a pickoff sheet. Numerous other such patents have been issued using various methods, and the area remains a fertile one for new patents to this day. These methods have been found to be very difficult to develop and replicate, and they are prone to differential thermal heating induced errors and production problems. Very small amounts of localized error or drift can cause substantial changes in coordinate response. The low resistance of the patterned edge strips causes problems with the driver circuitry, forcing the driver circuitry to consume more power and be much more expensive than otherwise. There are a significant number of patents that reference the Pepper patents and which purport to do similar things. The improvements delivered by Pepper etc over Becker are arguably marginal, as at least Becker is easier and more repeatable to fabricate.

Edge Resistance with Wire Element: Kable in U.S. Pat. No. 4,678,869 discloses a 2D array for pen input, using resistive divider chains on 2 axes with highly conductive electrodes connected to the chains, the electrodes having some unintended resistance for the purposes of detection, and the detection signal being interpolated from the signals generated between two adjacent electrodes. The unintended resistance causes a slight amount of pin cushion in the response. This patent also describes an algorithmic means to compensate for the slight pin-cushion distortion developed by this technique. The Kable method is not operable with other than a connected stylus, i.e. it is not described as being responsive to a human finger. The Kable patent requires crossovers between conductors and thus needs at least three construction layers (conductor, insulator, conductor).

Multiple Active-Edge Electrodes: Turner in U.S. Pat. No. 3,699,439 discloses a uniform resistive screen with an active probe having multiple electrode connections on all four sides to linearize the result.

Yoshikawa et al, in U.S. Pat. No. 4,680,430, and Wolfe, in U.S. Pat. No. 5,438,168, teach 2DCT's using multiple electrode points on each side (as opposed to the corners) to facilitate a reduction in pin cushion by reducing the interaction of the current flow from the electrodes on one axis with the electrodes of the other. While the element is a simple sheet resistor, this approach involves large numbers of active electronic connections (such as linear arrays of diodes or MOSFETs) at each connection point in very close proximity to the element.

Nakamura in U.S. Pat. No. 4,649,232 teaches similarly as Yoshikawa and Wolfe but with a resistive pickup stylus.

Sequentially Scanned Stripe Element: Greanias et al in U.S. Pat. No. 4,686,332 [16] and U.S. Pat. No. 5,149,919, Boie et al in U.S. Pat. No. 5,463,388, and Landmeier in U.S. Pat. No. 5,381,160 teach methods of element sensing using alternating independently driven and sensed stripe conductors in both the X and Y axis, from which is interpreted a position of a finger touch or, by a pickup device, a stylus pen. The construction involves multiple layers of material and special processing. Greanias teaches the use of interpolation between the stripes to achieve higher resolution in both axis. Both require three or more layers to allow crossovers of conductors within the element. Both rely on measurements of capacitance on each stripe, not the amount of cross coupling from one stripe to another. Boie also teaches a special guardplane.

Binstead, in U.S. Pat. No. 5,844,506 and U.S. Pat. No. 6,137,427 teaches a touch screen using discrete fine wires in a manner similar to those taught by Kable, Allen, Gerpheide and Greanias. Binstead uses very fine row and column wires to achieve transparency. This patent also teaches the Greanias method of interpolation between electrode wires to achieve higher resolution. The scanning relies on measurements of capacitance on each stripe to ground, not the amount of cross coupling from one to another.

Evans in U.S. Pat. No. 4,733,222 also describes a system wherein stripes are sequentially driven in both X and Y axis, using also an external array of capacitors to derive sensing signals via a capacitor divider effect. Interpolation is used to evaluate finer resolutions than possible with the stripes alone.

Volpe in U.S. Pat. No. 3,921,166 describes a discrete key mechanical keyboard that uses a capacitive scanning method. There are sequentially driven input rows and sequentially sensed columns. The press of a key increases the coupling from a row to a column, and in this way n-key rollover can be achieved; there is no need for interpolation. Although not a 2DCT, Volpe presages scanned stripe element 2DCT technology. My own U.S. Pat. No. 6,452,514 also falls into this classification of sensor.

Itaya in U.S. Pat. No. 5,181,030 discloses a 2DRT having resistive stripes which couple under pressure to a resistive plane which reads out the location of contact. The stripes, or the plane, have a 1D voltage gradient imposed on them so that the location of contact on particular the stripe can be readily identified. Each stripe requires its own, at least one electrode connection.

Cyclical Scanned Stripe Element: Gerpheide et al, in U.S. Pat. No. 5,305,017 teaches a touch-pad capacitance-based computer pointing device using multiple orthogonal arrays of overlapping metallic stripes separated by insulators. The scan lines are arranged in a cyclically repeating pattern to minimize drive circuitry requirements. A cyclical nature of the wiring of the invention prevents use of this type of 2DCT for absolute position location. The invention is suited to touch pads used to replace mice, where actual location determination is not required, and only relative motion sensing is important. Gerpheide teaches a method of signal balance between two phase-opposed signals at the location of touch.

Parallel Read Stripe Element: Allen et al in U.S. Pat. No. 5,914,465 teach an element having rows and column scan stripes which are read in parallel by analog circuitry. The patent claims lower noise and faster response times than sequentially scanned elements. The method is particularly suited to touch pads for mouse replacement but does not scale well to higher sizes. Multiple construction layers are required as with all stripe element 2DCT's. The Allen method requires large scale integration and high numbers of connection pins. It interpolates to achieve higher resolution than achievable by the number of raw stripes.

In my co-pending U.S. application Ser. No. 10/697133, "Charge Transfer Capacitive Position Sensor" there is described in conjunction with FIG. 12 a method of using individual resistive 1-D stripes to create a touch screen. These stripes can be read either in parallel or sequentially, since the connections to these stripes are independent of one another. Furthermore, in connection with FIG. 6 there is described an interpolated coupling between adjacent lumped electrode elements and an object such as a finger. U.S. application Ser. No. 10/697133 is incorporated herein by reference.

Numerical Methods

Nakamura in U.S. Pat. No. 4,650,926 describes a system for numerical correction of an electrographic system such as a tablet, using a lookup table system to correct raw 2D coordinate data.

Drum, in U.S. Pat. No. 5,101,081 describes a system for numerical correction of an electrographic system such as a tablet via remote means.

McDermott in U.S. Pat. No. 5,157,227 teaches a numerical method of correcting a 2DxT employing stored constants which are used during operation to control one or more polynomials to correct the location of reported touch by zone or quadrant.

Babb et al, in U.S. Pat. Nos. 5,940,065 and 6,506,983 teach a numerical method to linearize a 2DxT uniform sheet element using coefficients determined during a learn process, without segmentation by zone or quadrant, and on an individual unit basis so as to correct for even minor process variations. The methods disclosed by Babb are complex and involve '80 coefficients' and fourth order polynomials, the coefficients of which must be determined through a rigorous and time-consuming calibration procedure. In tests supervised by the instant inventor, it has been found that $6^{th}$ order polynomials are required to produce accuracy levels that are acceptable in normal use, and that the result is still highly prone to the slightest subsequent variations post-calibration due to thermal drift and the like. In particular it has been found that the corner connections are extreme contributors to long-term coordinate fluctuations, as they act as singularities with a high gain factor with respect to connection size and quality. Furthermore, the method of numerical correction requires high-resolution digital conversions in order to produce even modest resolution outputs. For example it has been found that a 14-bit ADC is required to provide a quality 9-bit coordinate result. The extra expense and power required of the amplifier system and ADC can be prohibitive in many applications.

Technology Summary

In all these methods there exists one or a combination of the following deficiencies:

Use of exotic construction materials or methods requiring special expertise or equipment to fabricate;
Excessive cost compared with simple, galvanic 4-wire resistive touch screens;
Require three or more layers to allow orthogonal conductor crossovers;
Costly wiring due to the need for many electrode connections;
Linearity problems requiring complex algorithms to correct;
Need for special linearizing edge patterns which are difficult to control;
Not well suited to small or large touch areas;
Inability to conform to complex surface shapes such as compound curves; and/or
Inability to operate through surfaces more than a few hundred microns thick.

SUMMARY OF THE INVENTION

According to the invention there is provided a touch sensitive position sensor comprising: a substrate defining a touch sensitive platform; first and second resistive bus-bars arranged spaced apart on the substrate; and an anisotropic conductive area arranged between the bus-bars such that currents induced in the anisotropic conductive area flow preferentially towards the bus-bars.

In typical embodiments of the invention, the bus-bars and the anisotropic conductive area have resistances of between 1 kΩ and 50 kΩ. The bus-bars preferably have substantially the same resistance, for example to within +/−10%, 20%, 50% or 100%. It is advantageous if the resistance of the bus-bars is less than the resistance between them provided by the anisotropic conductive area.

The anisotropic conductive area can be fabricated using a film of molecular substance having anisotropic conduction supported on a substrate, or a plurality of resistive stripes connecting in parallel between the first and second resistive bus-bars, or in other ways.

When resistive stripes are used to form the anisotropic conductive area these can be made of sections of resistive wire, or from resistive material deposited on a substrate, for example. Moreover, the width of the resistive stripes is preferably greater than the gaps between them.

In some embodiments of the invention, a conductive overlay is provided that is separated from the anisotropic conductive area such that the conductive overlay and the anisotropic conductive area may be brought into contact by externally applied pressure.

In some embodiments, the first resistive bus-bar extends between a first and a second electrode and the second resistive bus-bar extends between a third and a fourth electrode, the position sensor further comprising first, second, third and fourth drive channels associated with respective ones of the first, second, third and fourth electrodes, each drive channel being operable to generate an output signal dependent on the resistance between its electrode and the position of the object. For processing the outputs, a processor may be provided that is operable to generate an estimate for the position of the object by comparing the output signals from the drive channels. The processor can be configured to estimate the position of the object in a first direction running between the bus-bars from a ratiometric analysis of the sum of the signals associated with the first and second electrodes and the sum of the signals associated with the third and fourth. It can also be configured to estimate the position of the object in a second direction running along the bus-bars from a ratiometric analysis of the sum of the signals associated with the first and third electrodes and the sum of the signals associated with the second and fourth electrodes. Moreover, the processor is preferably further operable to apply a correction to the estimated position according to a pre-determined distortion associated with the sensing element. Typically, the pre-determined distortion is a one-dimensional pin-cushion distortion.

It will be understood that a touch sensitive position sensor according to the invention can be incorporated into a control panel and in turn the control panels can be integrated as part of a variety of different apparatuses.

According to the invention there is also provided a touch sensitive position sensor for detecting the position of an object in two dimensions, wherein the position sensor has first and second resistive bus-bars separated by an anisotropic conductive area, the anisotropic conductive area being arranged such that induced electric currents flow preferentially towards the bus-bars. Because induced currents, for example those induced by drive circuitry associated with the sensing element, flow preferentially along one direction, pin-cushion type distortions in position estimates are largely constrained to this direction. Such one-dimensional distortions can be corrected for by applying scalar correction factors.

The invention provides a new pattern of conductive material for sensing capacitance behind a plastic or glass panel or other dielectric, which is to be used as a 2DxT, whether in the format of a touch screen or 'touch pad'.

The invention blends some of the features of unpatterned 4-electrode elements together with striped elements and mathematical compensation to arrive at a new classification of anisotropic 2DxT element, or simply, a 'striped element'. This invention addresses the deficiencies of previous 2DxT approaches and is very low in cost, using as it does conventional processes and materials.

Unless otherwise noted hereinafter, the terms 'connection(s)' or 'connected' refer to either galvanic contact or capacitive coupling. 'Element' refers to the physical electrical sensing element made of conductive substances. 'Electrode' refers to one of the galvanic connection points made to the element to connect it to suitable driver/sensor electronics. The terms 'object' and 'finger' are used synonymously in reference to either an inanimate object such as a wiper or pointer or stylus, or alternatively a human finger or other appendage, any of whose presence adjacent the element will create a localized capacitive coupling from a region of the element back to a circuit reference via any circuitous path, whether galvanically or non-galvanically. The term 'touch' includes either physical contact between an object and the element, or, proximity in free space between object and element, or physical contact between object and a dielectric (such as glass) existing between object and element, or, proximity in free space including an intervening layer of dielectric existing between object and element. The mention of specific circuit parameters, or orientation is not to be taken as limiting to the invention, as a wide range of parameters is possible using no or slight changes to the circuitry or algorithms; specific parameters and orientation are mentioned only for explanatory purposes.

Note my prior patents covering charge-transfer capacitive sensing, particularly U.S. Pat. No. 5,730,165, U.S. Pat. No. 6,288,707, U.S. Pat. No. 6,466,036, U.S. Pat. No. 6,535,200, U.S. Pat. No. 6,452,514 and my co-pending U.S. application Ser. No. 10/697,133. In particular it should be noted that the electronic sensing circuitry and methods described in each of these patents can be used in conjunction with the invention described herein, but, these methods are not the only ones. A variety of capacitive sensing circuits can be used with the invention. Various electrical circuits and sensing methods described in these patents can be employed to drive the electrodes of the invention and to interpret the results.

Note also my U.S. application Ser. No. 10/341,948 (US 20030132922) which deals with handshadow effects on capacitive touchscreens, and which has a possible application to the invention in a post-processing role for 2DCT's.

My co-pending patent application U.S. Ser. No. 10/697133, "Charge Transfer Capacitive Position Sensor" in particular as described in conjunction with FIG. 12 therein, forms a germinal basis for the invention, and whose circuit description and switching methods are particularly well adapted to drive the electrodes of the invention in a 2DCT mode. The invention is a new pattern of conductive material, such as an ink or vacuum deposited material, arranged electrically as a single layer element, with pin-cushion distortion on only one axis. The remaining pin-cushion distortion is easily corrected algorithmically or in hardware, vastly simpler than Babb & Wilson, as will be described below. The element pattern is easily fabricated using known methods and is conformable to complex surfaces such as compound curved cover lenses and the like. The pattern exhibits strong anisotropic conductance characteristics in a core sensing region bounded by peripheral unidirectional resistive conductors.

It is one object of the invention to provide for a 2DxT sensing element using common, inexpensive materials and production processes, with anisotropic galvanic conduction characteristics.

It is a further object of the invention to provide a 2DxT sensing mechanism having an edge distortion that is readily correctable using simple, computationally inexpensive methods.

It is an object of the invention to permit position interpolation so as to achieve the highest possible resolution with the simplest possible pattern.

It is another object of the invention to provide a 2DxT element allowing a high positional resolution and low granularity result with relatively coarse raw signal analogue-to-digital converter (ADC) resolution.

Another object is to provide a 2DxT element that is less susceptible to thermal drift, and is highly repeatable in the manufacturing process.

Another object of the invention is to provide a 2DxT element that either requires a highly simplified 'learn' calibration process compared with the prior art, or, calibration via design, or, none at all.

Another object is to provide for a 2DCT element having only one required layer of conductive material.

A further object is to allow this layer to reside on the rear of relatively thick dielectric cover lenses such as glass or plastic sheet, up to 10 mm in thickness or more, or through air by pointing.

A further object of the invention to provide a 2DxT element having relatively simple wiring requirements;

Further objects of the invention are to provide for a sensor having high reliability, a sealed surface, low power consumption, and the ability to be controlled and sensed directly using off-the-shelf microcontrollers and non-exotic drive electronics.

Further particular and preferred aspects of the invention are set out in the following non-limiting independent and dependent clauses:

1. Apparatus of a type wherein a surface is selectively accessed with respect to positional data, comprising a conductive element having a core with a direction of preferential galvanic conduction.
2. The apparatus of clause 1 wherein the element is bounded by a conductive border
3. Clauses 1 or 2 wherein the element resides on a single layer
4. Clauses 1 or 3 including a plurality of electrodes
5. Any preceding clause including circuitry connected to said element for the purpose of evaluating the location of touch in two dimensions, where the connections are made to the electrodes.
6. Any preceding clause including processing means to correct for pin-cushion distortion
7. Clause 6 wherein the correction is a scalar coefficient.
8. Clause 6 wherein the correction is based on a set of scalar coefficients
9. Clause 6 wherein the correction is based on a formula of the type $$Pc y_{(x,y)} = \frac{P_Y}{k_1 X^2 + k_2 X + k_3}$$

10. A method of fabricating an element used for the determination of positional location of touch, whereby the element is made to have anisotropic conductivity with a conductive perimeter.
11. Clause 10 where the element is made from an anisotropic material.
12. Clause 10 including a method to correct for positional distortion
13. Clause 12 wherein the method for correction of distortion is only applied to one axis.
14. Clause 12 wherein the method for correction of distortion is based on scalar multiplication.
15. Any preceding clause whereby the electronic circuitry employs rail-referenced charge-sensing according to any method disclosed in my U.S. Pat. No. 6,466,036 [34].
16. Clause 15 whereby the circuitry comprises a microcontroller.
17. Any preceding clause whereby the element is made from an optically transmissive resistive conductor.
18. Any preceding clause whereby the element comprises a plurality of zones of anisotropic conductance sharing common bus-bars.
19. A touchscreen having an optically transmissive element of anisotropic conductance, affixed to the distal side of an optically transmissive substrate, the proximal side being used for touch, having a plurality of electrodes.
20. Clause 19 whereby the electrodes are connected to a sensing circuit using conductive rubber.
21. Clause 19 or 20 whereby the touchscreen is mounted over an electronic display.

BRIEF DESCRIPTION OF THE DRAWINGS

For a better understanding of the invention and to show how the same may be carried into effect reference is now made by way of example to the accompanying drawings in which:

FIG. 1b schematically shows the normalization vectors required to linearize the element of FIG. 1a;

DETAILED DESCRIPTION

Figure 1A:
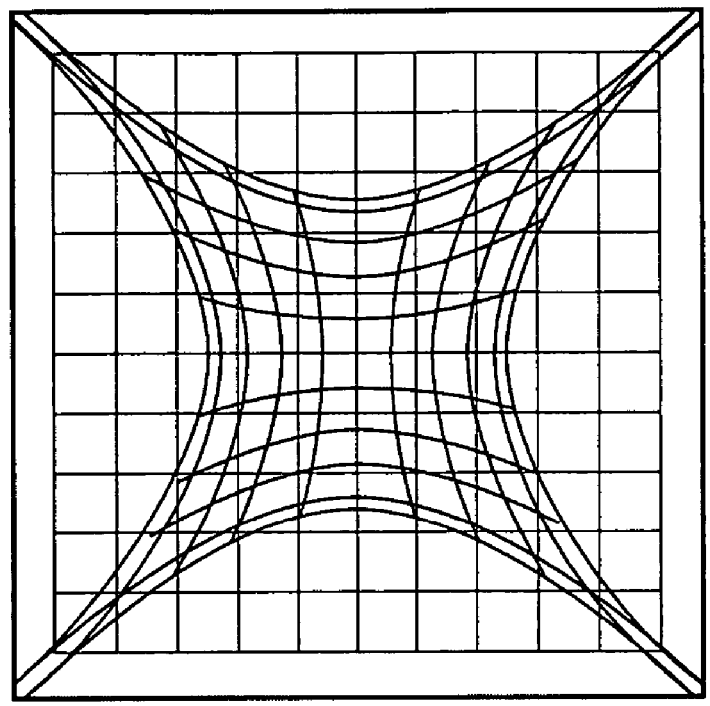
FIG. 1a schematically shows typical pin-cushion distortion effects found in unpatterned, single element two-dimension transducers made from a resistive film having four corner electrodes and a 'pickoff' flexible cover sheet according t the prior art.
Figure 1B:
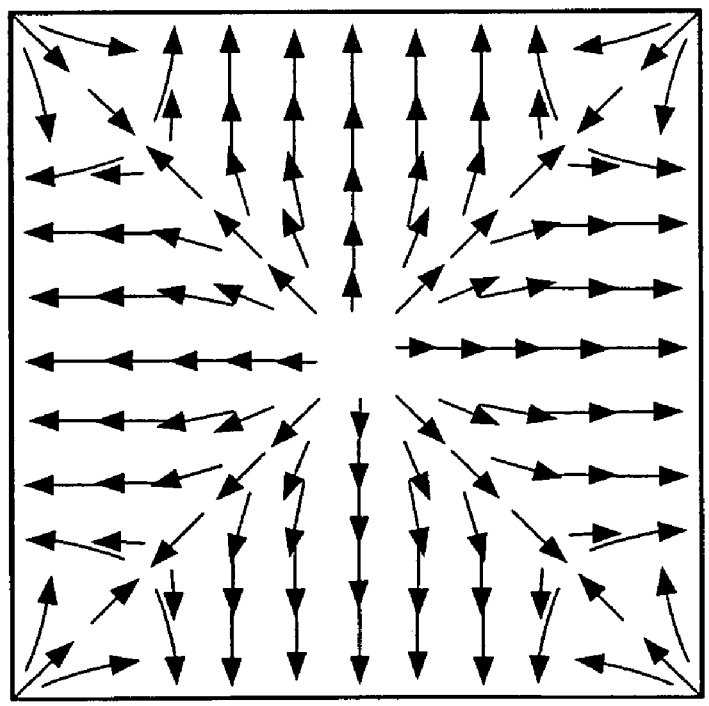

FIGS. 1a and 1b show the prior art for 2DxT technology prior to the use of correction hardware or algorithms. The pin cushion effect of FIG. 1a is well understood. It arises from the current sharing of capacitance-induced flows from the point of touch to the four capacitance connection points; the effect is seen in both 2DCT's and in 2DRT 5-wire touch screens which rely on a galvanic version of the same voltage gradients as a 2DCT, but with a flexible 'pickoff' cover sheet that deflects and connects to the 2DRT under pressure. The pin cushion effect in these elements increases as the location of touch becomes more distant from all connection points, along an edge; it is at its worst at the centers of the screen edges. As shown in FIG. 1b, the current flows establish vectors that introduce a graduated distortion with position, resulting in a parabolic curvature of reported location. The vectors are generally non-orthogonal. Instead the angle and magnitude of correction vary wildly depending on the location of touch on the element.

Figure 2:
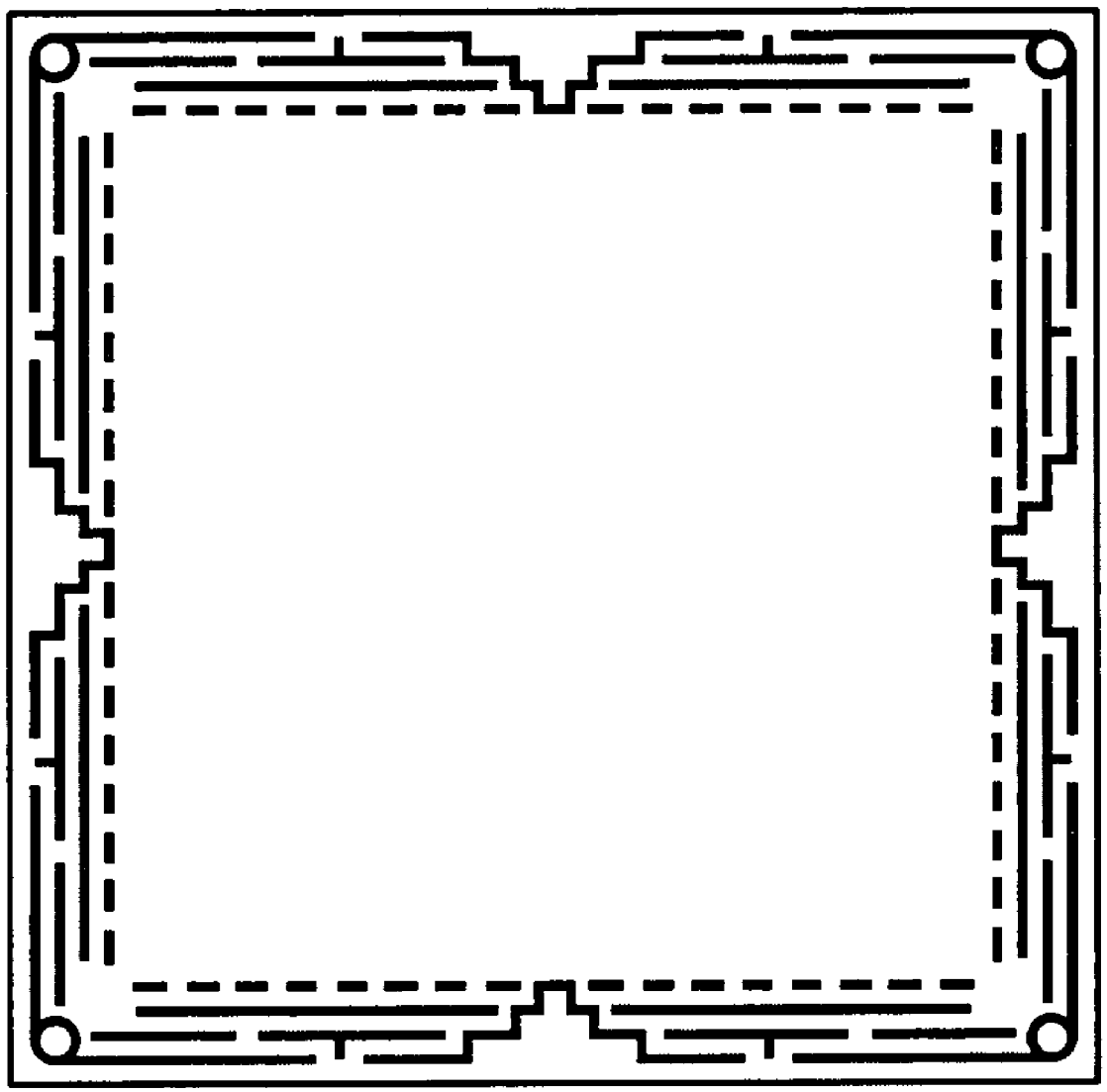
FIG. 2 shows a known capacitive or resistive touch screen edge pattern designed to correct pin cushion effects in screens suffering from distortions of the kind shown in FIGS. 1a and 1b.

Various methods have been devised to counter this effect, notably the use of very low resistance bus-bars around the conductive screen, special edge patterns, multiple connection points to the edges of the screen, and so on, as described above. Discrete conductors, as seen in Binstead, Gerpheide, Kable and Greanias largely solve the problem of pin cushion by using exotic construction methods using multiple layers, expensive circuits, and a high electrode connection count. These types of screens do not scale well with size and are expensive to fabricate. An example of such a method is the edge pattern devised by Pepper which is shown in FIG. 2. This pattern is known to be very difficult to duplicate, suffers from thermal drift, and is relatively expensive to engineer and fabricate.

There is a substantial demand for a new capacitive touch screen method that is less expensive and simpler to manufacture than the above methodologies yet is highly robust and suitable for use in hostile environments. In particular there is a need for such devices in the applications of domestic appliances, mobile phones and other hand-held devices, POS terminals, and so on.

Embodiments of the invention provide a compromise between the 'no pin cushion' but expensive circuitry and fabrication cost of prior-art striped elements, and unpatterned resistive sheet elements. This new hybrid solution produces a pin cushion effect only on one axis, leaving the other axis largely undistorted. Furthermore, as will be seen, the residual pin-cushion distortion has a largely orthogonal and predictable vector which can be compensated using relatively trivial numerical methods, is highly repeatable from unit to unit, and is more immune to differential thermal drift than the prior art.

Figure 3:
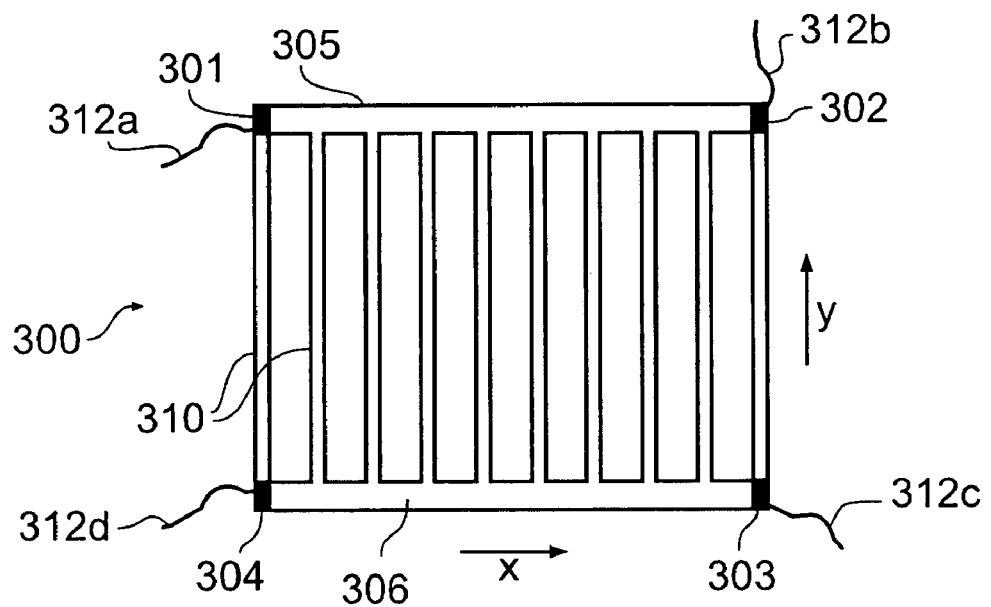
FIG. 3 schematically shows a two-dimensional pattern representative of the conductive material used to form a sensing element according to an embodiment of the invention.

In FIG. 3 is shown a pattern representative of the conductive material used in a sensing element according to an embodiment of the invention. The diagram shows a single conductive element on one layer having four electrodes 301, 302, 303, and 304. Two relatively low resistance bus-bars 305 and 306 traverse from 301 to 302, and 304 to 303 respectively. A plurality of stripe conductors 310 traverse from bus-bar 305 to 306, numbering at least two but typically 3 or more. Two of these stripes traverse from the ends of each bus-bar to the other, thus forming a fully bounded surface. The end stripes can also be considered to be bus-bars, but as they can optionally have a higher path resistance than the horizontal bus-bars shown, they remain unique and thus will be called stripes throughout.

The element of the invention can alternatively be viewed as having a core area characterized by anisotropic conductivity with a surrounding, bounding border made from linear conductive segments. The purpose of the stripes is to force anisotropic galvanic flows within the core area. Once the current flows reach the boundary paths, they are finally led to the electrode connections.

Figure 11:
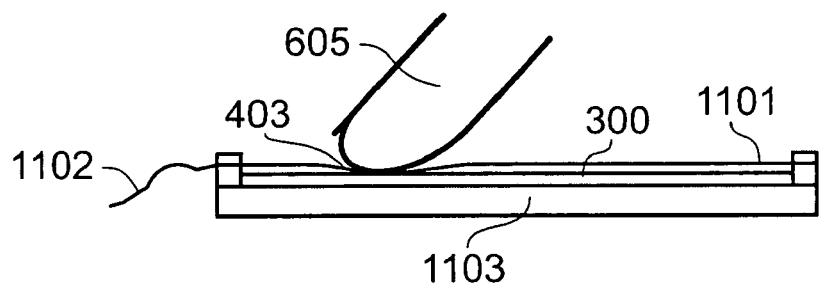
FIG. 11 schematically shows a vertical section the sensing element of FIG. 10 forming part of a resistive touch screen.

The number of stripes 310 appropriate for a design depends on the width of the element in relation to the size of the object being sensed, as will be discussed below. Wires 312a-d connected to the electrodes connect the element to a drive/sensing circuit in the case of a 2DCT. In the case of a 2DRT wires 312*a-d* are connected to a drive circuit, the sensing function coming from a flexible user-depressed cover sheet as shown in FIG. 11.

Figure 10:
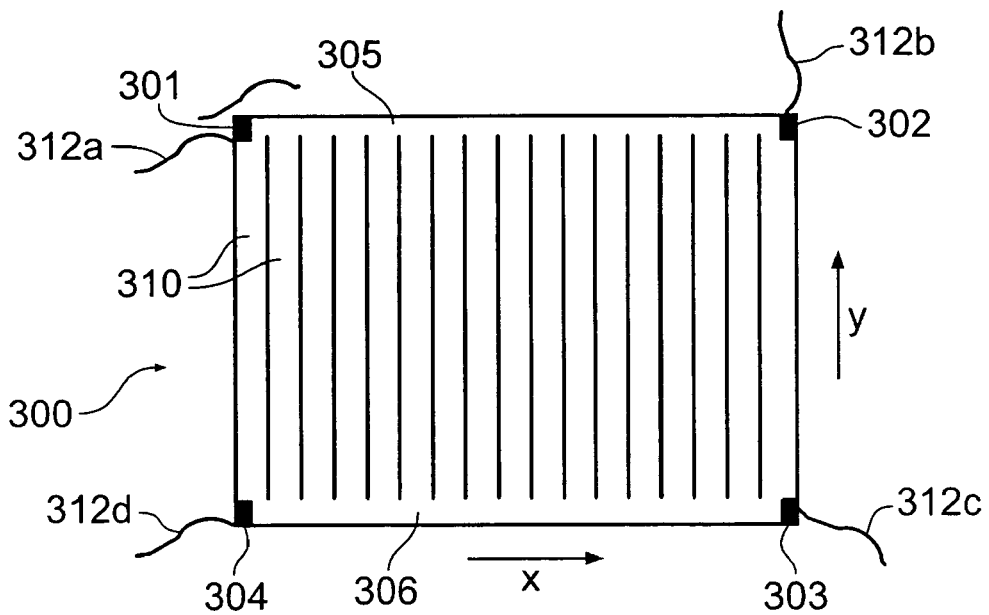
FIG. 10 schematically shows a two-dimensional pattern representative of the conductive material used to form a sensing element according to yet another embodiment of the invention.

FIG. 10 shows another pattern embodying the invention. This pattern is substantially the same as the pattern of FIG. 3 except that the stripes are separated by thin slits (i.e. the stripes are relatively wider than those shown in FIG. 3), so that the element is principally coated with conductive material and only a very small percentage—the slits—is uncoated. This configuration is more suitable for 2DRT use as described further below, but can also be used in 2DCT applications. One advantage of this for 2DCT use is that the stripes have larger surface areas than in the FIG. 3 example, so that the capacitive coupling from finger to element is enhanced. One disadvantage of this is that the total resistance from bus-bar to bus-bar is lower for a particular sheet resistance, which will tend to exacerbate the pin cushion effect as described below.

The relative resistances of the stripes and bus-bars in FIG. 3 as tested are about 40K ohms for the bus-bars, and 160K ohms for the stripes, although in practice these figures are only for guidance and they are not limiting to the invention. The use of higher resistance value stripes than bus-bars is helpful to limit pin cushion effects, but since pin cushion is easily correctable numerically anyway, almost any combination of values will work to varying degrees of satisfaction. It is a considerable attraction of the invention that it is usable with elements having a high resistance, as such an element requires lower cost and lower power drive and sensing electronics.

Figure 4:
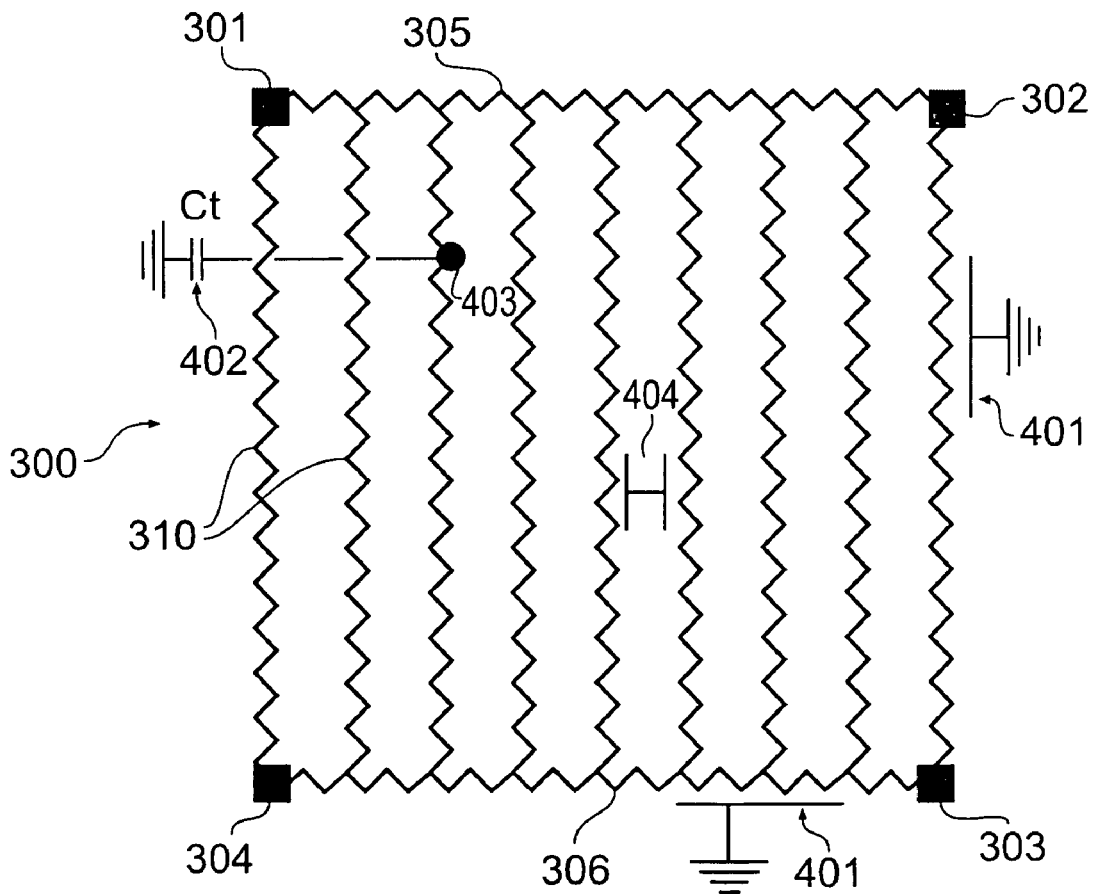
FIG. 4 schematically shows an electrical circuit representation of the sensing element of FIG. 3.

FIG. 4 shows a lumped model of typical embodiments of the invention. Bus-bars 305 and 306 are composed of lines with a resistance from about 1K to 50K ohms, and ideally are matched to within 10% of each other. Stripes 310 are composed of resistive lines of about 5 to 10 times more than the resistance of the bus-bars. There are 9 stripes shown in FIG. 4. Corner electrodes 301, 302, 303, and 304 are used to connect the element to drive/sensing electronics, either capacitive sensing drivers for a 2DCT or galvanic drivers in the case of a 2DRT. Each stripe and bus-bar has some stray background capacitance 401 to circuit ground. Stripes have mutual capacitance 404 between neighbors. Such background capacitances are benign in nature and have been show to have no effect on the performance of the invention. These capacitances do not have to be equal or balanced for the invention to work, as the element obeys the physics of superposition, and such parasitic values are easily calibrated away by the drive electronics as will be described below.

Shown is a capacitance Ct, 402, at position 403 due to a touch in 2DCT mode. The invention is fully tolerant of the magnitude of Ct, in that it allows the use of circuitry and/or algorithms that responds ratiometrically to the four electrode signals to derive a position independent of the magnitude of Ct. In 2DRT mode, the coversheet picks off a gradient potential, usually using time-multiplexed drive signals to the four electrodes upon galvanic connection from the coversheet to the element under the pressure of touch.

Figure 5:
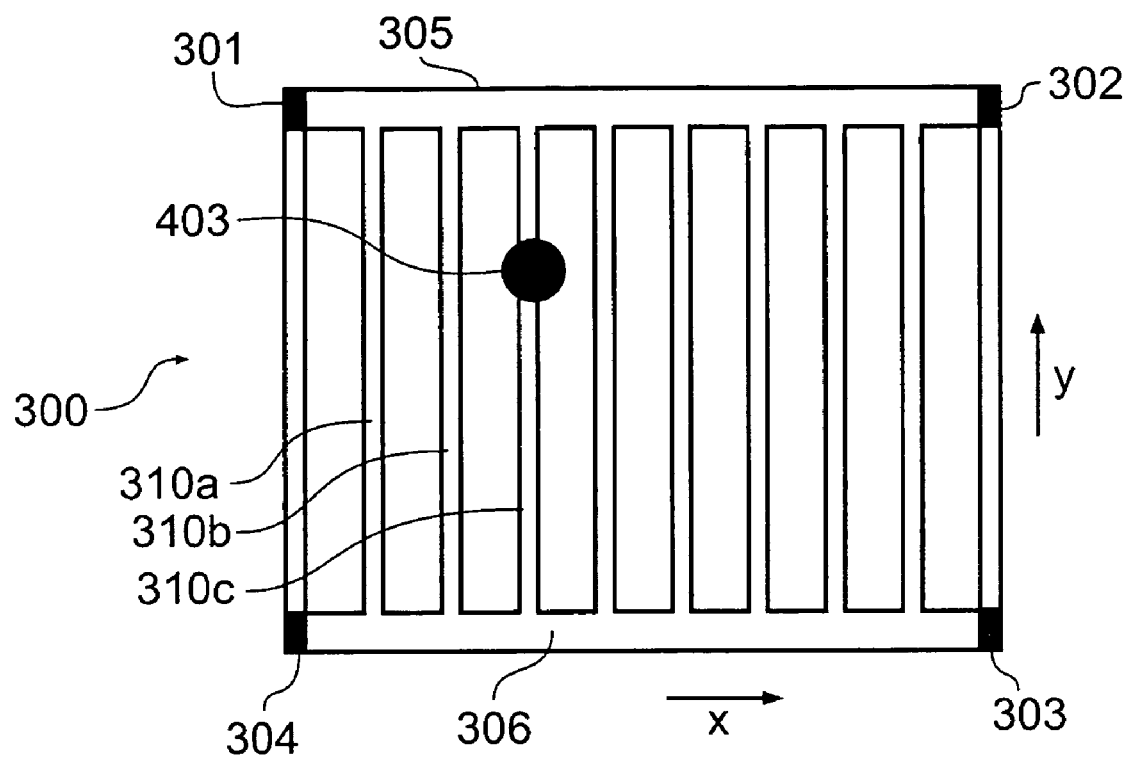
FIG. 5 schematically shows the sensing element of FIG. 3 with the location of a touch identified.
Figure 6:
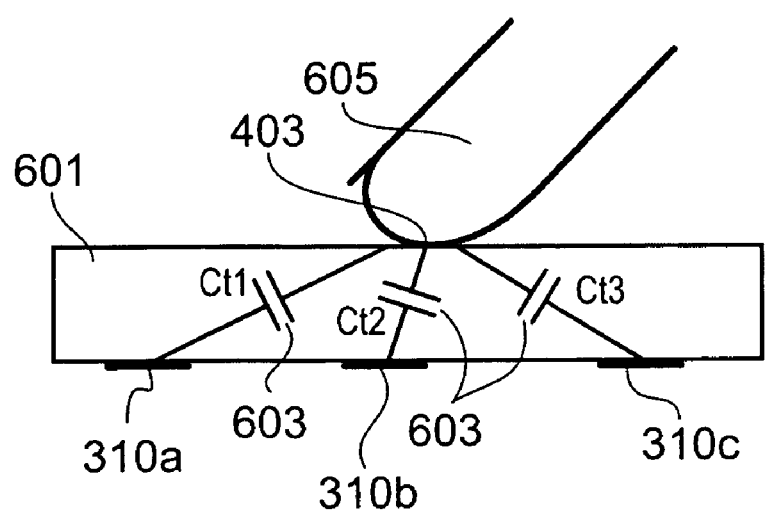
FIG. 6 schematically shows a vertical section the sensing element of FIG. 5 taken at the location of the touch.

In 2DCT mode it is also possible to have a touch between stripes and to interpolate the location of touch. FIG. 5 shows the element with a touch capacitance geographically located at 403 due to finger (not shown). FIG. 6, in which is shown a cross section of the invention attached to a substrate such as glass. The capacitance 603 due to touch of finger 605 is split into three smaller parts, Ct1, Ct2, and Ct3 as shown in FIG. 6, whose ratio depends on the relative location of the touch among the stripes 310*a,b,c*. In FIG. 6 of my co-pending U.S. application Ser. No. 10/697133 is shown an interpolation between two adjacent electrodes connected by a resistance.

The interpolation of touch in the instant invention operates in exactly the same manner among stripes in X, but also occurs along each stripe in the Y axis (not shown). The separating resistance in X is the path starting on each stripe with each Ct 603, back through the bus-bars to the other stripe. The interpolation in the X direction is proportioned according to the resistance of the short segment of bus-bar resistance connecting the two Y stripes, as a percentage of the total electrical bus-bar 'length'. The resistance of the stripe itself is not of consequence for resolving X location, since the ends of each stripe are driven to equipotentials in most 2DCT drive circuits described in the literature, and certainly when driven by the charge-transfer circuits described in my various earlier patent publications. Thus, if the stripes are spaced apart by 10% of the total bus-bar length, then the opportunity for interpolation will be 10% of the X dimension.

Note that the element of FIG. 5 could be rotated through 90 degrees and the above discussion would have been in regard to the Y dimension. There is no preferred angle of orientation of the element of the invention with regard to detection and location of touch. The discussions and formulae noted below are based on an assumption of convenience i.e. that the stripes are aligned in a vertical, Y orientation; however, rotation of the element through 90 degrees would provide identical physical operation and the equations would still hold albeit translated through 90 degrees. Specificity in regard to the orientation in this patent is not intended except as a matter of explanatory convenience and should not be held to be limiting in anyway.

The measurement circuitry, well described in the literature from a variety of inventors but preferably of any type as disclosed by the inventor in his U.S. Pat. Nos. 6,288,707, 6,466,036 and co-pending application Ser. No. 10/697133, is used by standard connection to the four corner electrodes 301, 302, 303, and 304. The measurement circuitry comprises four drive channels coupled to respective ones of the electrodes shown in FIG. 3 with each channel being operable to generate an output signal dependent on the resistive path length between its electrode and the position of the touch. While other methods might use other formulae, the preferred method of calculation of the position of touch is an adaptation of the one disclosed in my co-pending application Ser. No. 10/697133. In this method the four corner signals are calibrated at some time to determine a baseline reference level of signal for each corner. The calibration step can occur once, for example during design, on the production line, or at each power-up event, or through a method that determines when the element is not being touched. Drift compensation can be applied as it is known from several of my prior patents and the datasheets of products from Quantum Research Group Ltd (UK), such as the QT110 device.

To compute the position of touch along X (i.e. the horizontal direction shown in FIG. 3) using the element of FIG. 3 the signals are processed according to the following steps assuming that the real time acquired signals associated with the four electrodes 301, 302, 303 and 304 are respectively S301, S302, S303, and S304, and the baseline reference levels are R301, R302, R303, and R304, respective to each corner:

1) Sum the references and signals in X:

$RX'=R301+R304$ (sum of left references)

$RX''=R302+R303$ (sum of right references)

$SX'=S301+S304$ (sum of left signals)

$SX''=S302+S303$ (sum of right signals)

2) Compute the delta signals in X, i.e. ΔSigX', ΔSigX":

$$\Delta SigX' = SX' - RX'$$

$$\Delta SigX'' = SX'' - RX''$$

3) Compute the ratio Px indicative of position in X:

$$Px = \Delta SigX'' / (\Delta SigX' + \Delta SigX'')$$

where the Px is in range of 0 . . . 1, '0' being the left edge, '1' the right edge. The formula for X can be re-expanded to:

$$P_x = \frac{S302 + S303 - R302 - R303}{S301 + S302 + S303 + S304 - R301 - R302 - R303 - R304} \quad \text{(Equation 1)}$$

To compute the position of touch along Y using the element of FIG. 3 the signals are processed according to a formula similar to that indicated above:
1) Sum the references and signals in Y:

$$RY' = R303 + R304 \text{ (sum of bottom references)}$$

$$RY'' = R301 + R302 \text{ (sum of top references)}$$

$$SY' = S303 + S304 \text{ (sum of bottom signals)}$$

$$SY'' = S301 + S302 \text{ (sum of top signals)}$$

2) Compute the delta signals in Y, i.e. ΔSigY', ΔSigY":

$$\Delta SigY' = SY' - RY'$$

$$\Delta SigY'' = SY'' - RY''$$

3) Compute the ratio Py indicative of position in Y:

$$Py = \Delta SigY'' / (\Delta SigY' + \Delta SigY'')$$

where the Py is in range of 0 . . . 1, '0' being the bottom edge, '1' the top edge.

The formula for Py can be re-expanded to:

$$P_y = \frac{S301 + S302 - R301 - R302}{S301 + S302 + S303 + S304 - R301 - R302 - R303 - R304} \quad \text{(Equation 2)}$$

The complete, reported but uncorrected or 'raw' estimated position is thus (Px, Py). The above equations are examples only, and other equations used in conjunction with other screens may also generate a comparable result.

In FIG. 6 is shown a touch 601 over a plurality of stripes creating a distribution of Ct over said stripes. The resultant charge flows in the element set up an areal distribution of Ct couplings across multiple stripes, roughly in proportion to the adjoining surface areas of touch and stripes. The principle of superposition applies (as it does in any sheet element) and the resultant determination of position will be properly weighted and hence located to a far higher effective resolution than the number of stripes would seem to indicate. This effect is used to greatly improve resolution in many other stripe based 2DCTs, for example in U.S. Pat. No. 4,733,222 (Evans), but whereas Evans uses numerical interpolation, the instant invention uses the physical properties of distributed capacitance among multiple stripes to achieve the same thing, without the need for further computation or for need for individual electronic addressability of each stripe. The interpolation is intrinsic to the element itself. This is an effect previously known to occur in 2DCT resistive sheet elements.

Figure 7A:
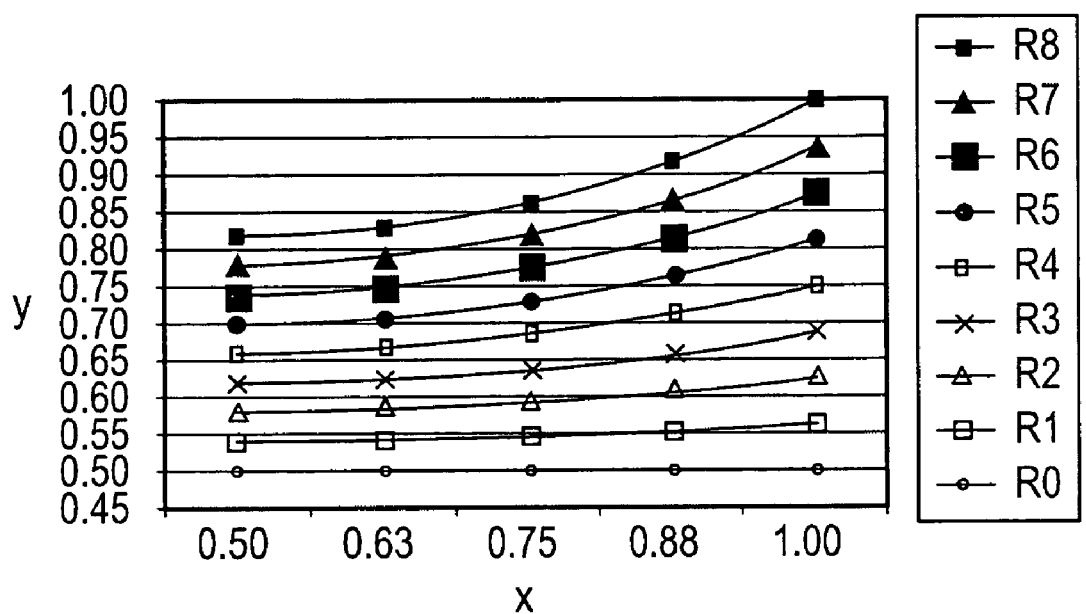
FIG. 7a schematically shows a row-by-row linearity plot in one quadrant of the sensing element of FIGS. 3 and 5.
Figure 7B:
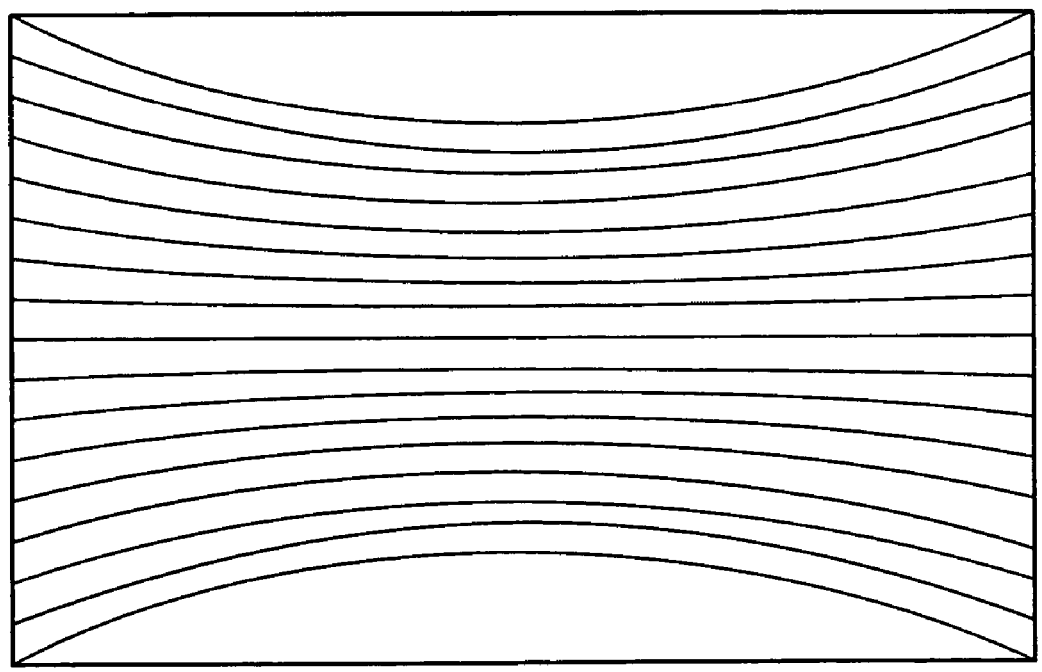
FIG. 7b schematically shows the distortion associated with the sensing element of FIGS. 3 and 5.

FIG. 7a shows the calculated position along the X axis by Y row of touch as calculated from the corner electrode signals according to Eqns 1 and 2 above for a series of touches made at different X locations between X=0.5 (center) and X=1 (right edge) along nine rows R0 to R8 corresponding to nine Y locations between Y=0.5 and Y=1. FIG. 7b schematically represents the distortion over all quadrants of the sensing element. A finger touching the element, whose circumference of contact encompasses a fractional number of stripes, shows no cogging or nonlinearity in X worth noting when dragged orthogonally to the stripes. This can be seen more graphically in FIG. 8 which shows a plot of the correction vectors for 7 rows cutting across the stripes in X. At no place is there a non-orthogonal, non-vertical correction vector.

This remarkable result comes about because the stripes restrict core galvanic current flows to the stripes, which lie only along the Y axis; this restriction prevents non-orthogonal current vectors anywhere in the element. Once the current flows reach a bus-bar from a stripe, the flow rotates 90 degrees and heads towards the two nearest corner electrodes. It is only at this stage that the currents can be diverted down adjacent stripes to electrodes on the second bus-bar. This creates the pin cushion effect along the bus-bars.

Figure 8:
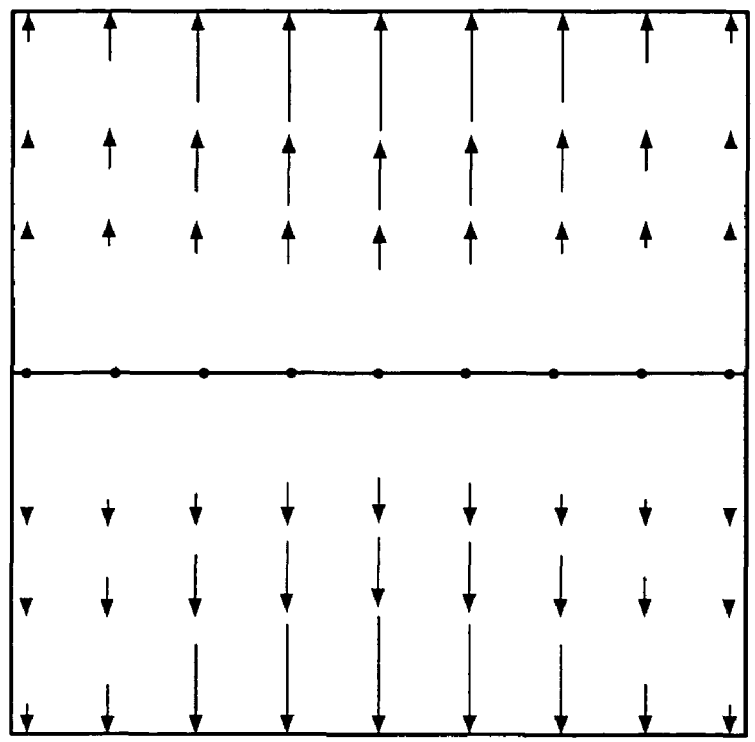
FIG. 8 schematically shows normalization vectors required to linearize the distortion shown in FIGS. 7a and 7b.

FIGS. 7a, 7b, and 8 show that in the Y axis the distortions are linear and can be corrected using a simple scaling factor which has a dependency on X. For each position in X, there exists a single scalar (non-vector) correction factor which can be use to arrive at a corrected position of touch in Y:

$$Pcy_{(x,y)} = P_Y \mathcal{J}_{(x)} \quad \text{(Equation 3)}$$

Where Py is the raw reported position in Y, Pcy(x,y) is the corrected position for Y as a function of X and raw Y, and $\mathcal{J}(x)$ is a correction factor unique to each position in X for which a correction factor is sought. The coefficients $\mathcal{J}(x)$ need only be solved for in any one quadrant (for example the quadrant represented in FIG. 7a), and the results mirrored for the other 3 quadrants. The fact that there is no non-orthogonal component to the correction, and that a single factor $\mathcal{J}(x)$ applies to any signal in Y(x), simplifies computations by two orders of magnitude over Babb so that very rapid compensation can be performed using slow, cheap microcontrollers for example costing under US$0.50. Furthermore the simplicity of the distortion and the correction method imply that the element is also more stable under fluctuating temperature or electrical conditions and is more repeatable to manufacture. Unlike Babb, the correction of the element does not require multiple trials to allow curve fitting. So long as the strip-to-bus-bar resistance ratio is repeatable (absolute stability is not required), the factors $\mathcal{J}(x)$ will be the same from one unit to the next. Inconsistencies from unit to unit will have only a limited effect on the error term in reported touch location, and errors on one axis will create only highly attenuated errors on the other axis. The element of the invention generally isolates error terms between X and Y, a non-trivial beneficial effect compared with the prior art.

The simplicity of the instant invention should be compare with the '80 coefficients' and fourth order polynomials required for Babb, the coefficients of which must be determined though an extensive calibration procedure. The instant invention may require only single point calibration, or in most cases no calibration at all, as element distortions are simple, predictable, and repeatable from unit to unit.

The ℑ(x) correction factors can be applied by means of a lookup table with interpolation to achieve a simple, fast correction. The correction factor ℑ(x) can also be computed mathematically using the simple quadratic equation:

$$\mathfrak{I}(X) = \frac{1}{k_1 X^2 + k_2 X + k_3} \qquad \text{(Equation 4)}$$

Leading to the complete equation for Y correction:

$$Pcy_{(x,y)} = \frac{P_Y}{k_1 X^2 + k_2 X + k_3} \qquad \text{(Equation 5)}$$

Where k1, k2 and k3 are coefficients that depend on the curvature of pin-cushion distortion, and X is the absolute magnitude of the position along the X axis starting from center-screen and moving in either the left or right direction. This quadratic equation was derived from simulation models and is accurate to better than 1%. It does not account for gross material nonlinearity which can be compensated for using secondary methods if required. The equations are dependent on resistance ratios between the bus-bars and the stripes as well as the geometric proportions of the element. The equations are unaffected by absolute resistance values.

The analysis supra applies equally to a 2DCT or a 2DRT. A 2DRT generally operates in 'reverse' to a 2DCT in that the element is only driven by signals, which are then picked off by a coversheet using a $5^{th}$ electrode connection for analysis purposes. The electrodes on the element proper are usually driven in a time-multiplexed mode so as to allow for unique signals to be picked up in alternating X and Y directions. For example the two left electrodes are first grounded, and the two right ones driven to a fixed and identical potential; the cover sheet is sampled to obtain a raw X position. The bottom electrodes are next grounded, and the top electrodes connected to a fixed and identical potential; the cover sheet is sampled to obtain a raw Y position. The process is repeated continuously, and a sample is declared valid only if the cover sheet is sensed to be in galvanic contact with the element. This is a potentiometric pickoff method, well described in the patent literature. Other 2DRT sampling methods are possible and the sequence noted in this paragraph should not be considered a preferred method, nor is the sampling method an object of the invention.

Equation 5 needs only a set of solutions in one quadrant, with the results mirrored for the other 3 quadrants. This is demonstrated in FIG. 7a and 7b. FIG. 7a shows the distortion in the top right quadrant; this pattern is mirrored in the other three quadrants to create the pattern of 7b.

Handshadow; Zonal 2DCT Element

The phenomenon of 2DCT handshadow is described in my U.S. application Ser. No. 10/341948 ( published as US20030132922) and in U.S. Pat. No. 5,457,289. Screens that are 'mobile phone size' such as 60×60 mm, will not generally suffer sufficiently from handshadow to warrant corrective action. However, if desired, one way to reduce the effects of handshadow is described in my aforesaid U.S. application Ser. No. 10/341948.

Figure 9:
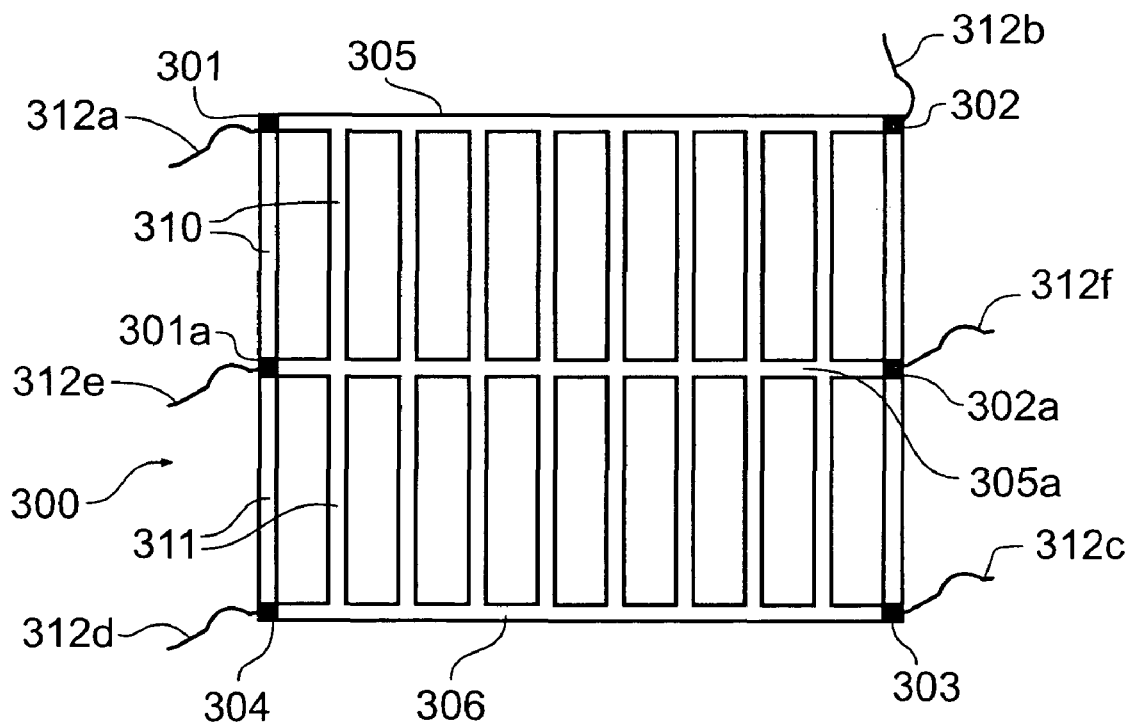
FIG. 9 schematically shows a two-dimensional pattern representative of the conductive material used to form a sensing element according to another embodiment of the invention.

A second method involves essentially repeating the element of the invention a second time as shown in FIG. 9. However, as can be seen from FIG. 9, this can be achieved by effectively sharing a bus-bar to reduce associated component counts. When the pattern is excited by driver/sensor circuitry on the 6 nodes (i.e. electrodes) 301, 302, 301a, 302a, 303 and 304 as shown, the element is effectively divided up in a way that allows it to be sensed in two different zones, top and bottom. Sensing within these zones is as described above. As handshadow capacitance occurs primarily below the point of touch, a touch in the upper zone will cause handshadow primarily in the lower zone, where it can be 'processed away' by simply ignoring the signals from said lower zone. There is very little cross-coupling of handshadow currents between zones.

Larger screens would make use of even more of these zones, to a number appropriate to the vertical size of the entire element and according to the severity of the problem.

2DRT Application

FIG. 10 shows an element having slits between stripes. Such a method of separating stripes is particularly useful for 2DRT usage, where a cover sheet is deflected to contact the element at a small point. If the point of contact is smaller than the gap between stripes 310, it can be that the coversheet fails to pick up a potential and the contact fails.

FIG. 11 shows a resistive screen according to the invention, wherein a cover sheet picks off a galvanic potential from the slit stripes of FIG. 10 when bent inwards via touch or via a stylus. The element of FIG. 11 is exactly as described above for a 2DCT, but the operating mode is according to various 5-wire screen modes as discussed in other patents and in the open literature. Normally the cover sheet is held apart from the element via tiny 'microbump' spacers (not shown), as is well known in the art.

Minimalist 2DCT

Figure 12:
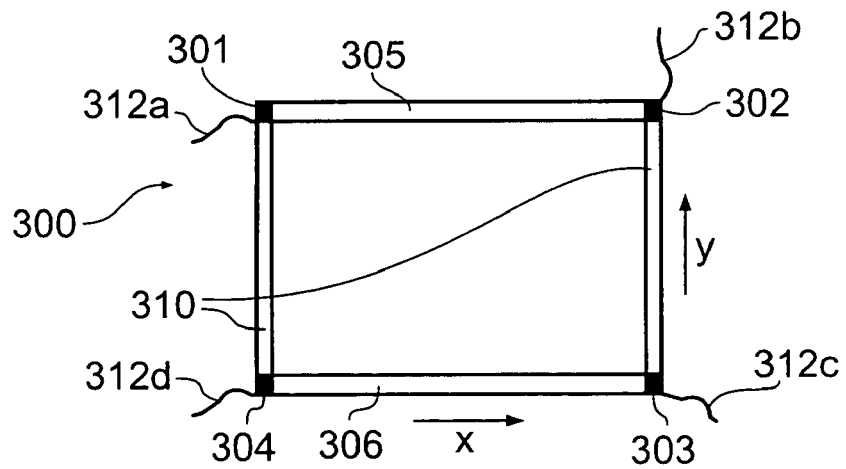
FIG. 12 schematically shows a two-dimensional pattern representative of the conductive material used to form a sensing element according to yet another embodiment of the invention.

FIG. 12 shows a minimal 2DCT case, where there are 2 bus-bars and two stripes, all on the periphery of an element. The element is of a size not significantly larger than the object being sensed, so that the signal levels in the middle do not significantly diminish due to distance from object to each conductive member. This example operates without measurable pin cushion as the impedances of the stripes and bus-bars are many orders of magnitude lower than the capacitive coupling impedance from object to any strip or bus-bar. In this minimal case, the stripes and bus-bars can have the same value or wildly differing values with minimal observable effect on resolution or linearity. If the element of FIG. 12 is for use by a human finger, the element should preferably be no more than 4 times as wide or high as the diameter of a finger in order to provide reasonable signal strengths. The element of FIG. 12 can be used to create a 'mini mouse pad' or pointer control, for example for use by those with minimal appendage mobility, whereby very small motions of a fingertip or other appendage control an appliance or GUI.

Point-Screen 2DCT Operation

The 2DCT element is suited to use in a 'point mode' where the user simply points at the screen. The easily correctable pin cushion and use of a single element mean that fields are not localized to short distances. As a result, the invention can be used as a 'point screen' device with reasonable accuracy in most menu-based graphical interfaces.

This mode of operation can be extremely beneficial in hygiene applications such as in hospitals, but also in ordinary consumer usage modes to prevent screen smudging.

2DCT Drive Circuitry

Figure 13:
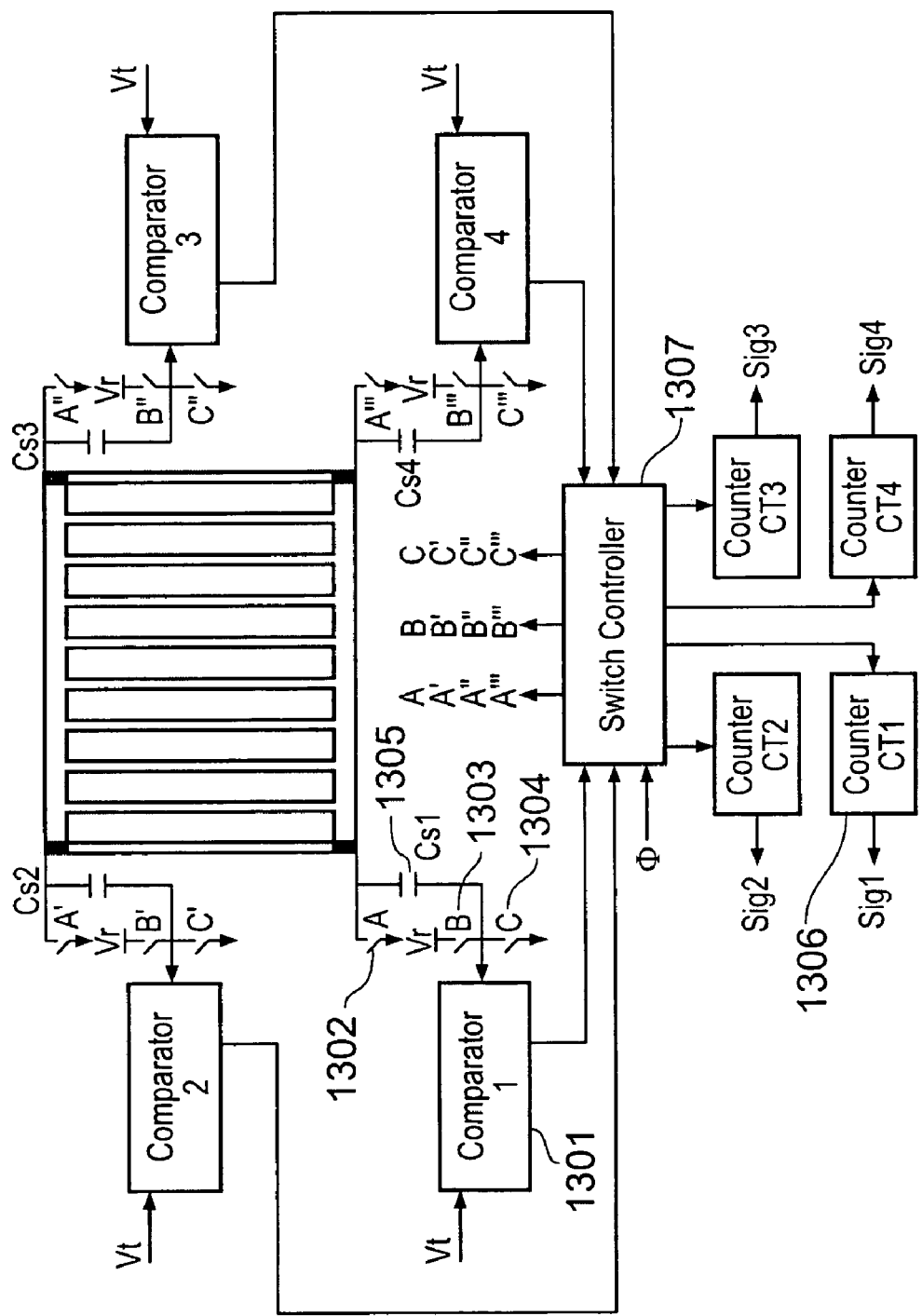
FIG. 13 schematically shows the sensing element of FIG. 5 having coupled to drive channels based on charge-transfer methods.

Refer now to FIG. 13, wherein is shown preferred (but not essential) drive circuitry for the 2DCT application of the invention. This circuit is of the same type as shown in my co-pending U.S. application Ser. No. 10/697133 but applied to all 4 electrodes (or 6 electrodes in the case of FIG. 9, etc). The repeated switching of switches 1302, 1303, 1304 at locations A, A', A", A''', B, B', B", B''', and C, C', C", C''' are performed simultaneously at each electrode so as to inject and measure charge using four capacitors, also referred to as sampling capacitors, Cs, 1305, at equal moments in time. This is performed via switch controller 1307. Signal outputs are the tabulated number of switching cycles for each electrode required to exceed a threshold voltage Vt, as determined by a voltage comparator 1301. The tabulation of cycle counts for each electrode is performed by four counters at 1306.

The operation of this circuitry is explained more fully in my U.S. application Ser. No. 10/697133, incorporated by reference herein.

The invention can alternatively employ any of the switching sequences and topologies as described in my U.S. Pat. No. 6,466,036, incorporated herein by reference.

Figure 14:
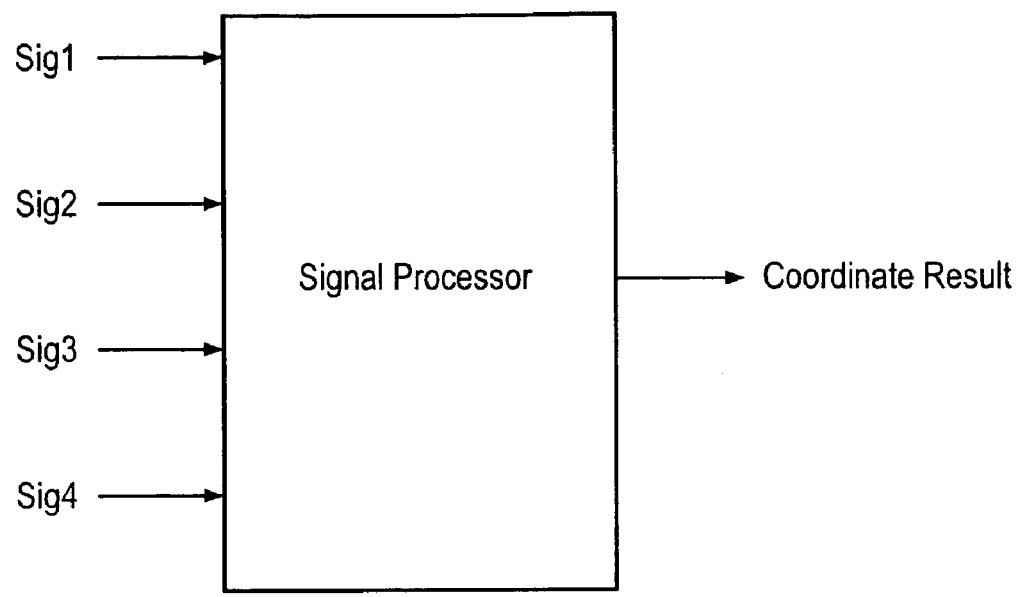
FIG. 14 schematically shows a processor arranged to receive signals output from the drive channels of FIG. 13 and to calculate an estimated position of a touch therefrom.

Signal processing circuitry is shown in FIG. 14, wherein the four electrode signals are input to the processing circuitry which in turn computes a coordinate result. A logic block, microcontroller, or other hardware or software is used to perform the calculations necessary to achieve the desired output. The block of FIG. 14 is usually a part of another system, such as a personal computer, process controller, appliance and so on, and the output may be only an intermediate result in a larger process.

Figure 15:
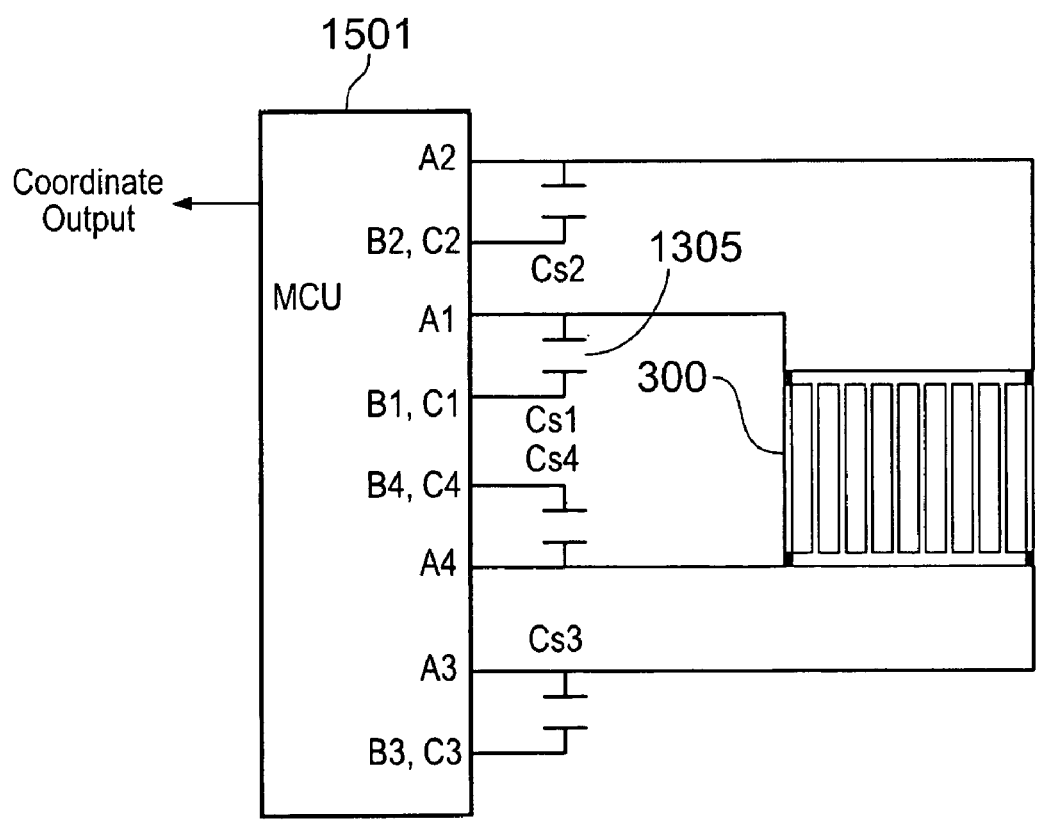
FIG. 15 schematically shows a microcontroller connected to four sampling capacitors, the microcontroller and capacitors being configured to provide the sensing channels and processor of FIGS. 13 and 14.

FIG. 15 shows a preferred embodiment of the invention wherein a single microcontroller 1501 performs the switching functions of FIG. 13, plus performs the signal processing of FIG. 14. The switching functions can be performed in software on a conventional I/O port, or with an on-chip hardware capacitive conversion peripheral. Signal processing is performed in software to achieve the desired coordinate output. This output could be a mere intermediate result used to control a larger process, and the output shown may only exist as numbers inside the chip.

Alternatively the invention can use any capacitive or resistive sensing circuit described in literature. The gradient response of the element is normally the same regardless of the type of drive circuitry. The invention is not reliant on any one acquisition method.

Materials, Fabrication

The 2DxT element is preferably made of a clear conductor of suitable resistance on the back of a glass or plastic sheet covering the display, if a touchscreen, or over a suitable dielectric substrate if a mousepad, etc.

As described in various other patents, the need for low-R bus-bars (under about 200 ohms end-to-end) on the edges causes all manner of driving, power, stability, and repeatability issues. It is highly desirable to use materials with a much higher resistance than currently in widespread use. Most ITO (Indium Tin Oxide) layers such as those produced by CPFilms, USA, or when custom-sputtered onto a surface, have resistances around 300 ohms per square. It is highly desirable to elevate this resistance to the neighborhood of 500 to 2000 ohms per square, so that the stripe and bus-bar resistances can be made in the region of 25K ohms and up from end to end.

One method of increasing bus-bar and stripe resistance from low resistance materials is to use a meandering path or zig-zag pattern so as to increase track length. Conventional low-resistance ITO or Tin-Oxide coatings can be etched or patterned to have intentional voids ('Swiss cheese' approach), thus raising the resistance. The stripes and bus-bars can also be made suitably thin so that the resistance is high enough to be more optimal.

Ideal materials however will have an intrinsic resistance of about 500 to 1,000 ohms per square or more, or can be modified to become so. Agfa's Orgacon™ conductive polymer is one material that has such a high intrinsic resistance and is also clear, making it usable in touch-screens over displays. A particularly low cost material is carbon based ink, well known in the electronics trade, however being opaque this material is better suited for tablet or mousepad applications.

The above being said, there is no requirement for any particular element resistance value, and the driving circuitry can be adapted to almost anything with varying degrees of difficulty. In theory the only requirement is that the elements have a non-zero resistance. However the bus-bar resistances should preferably be comparable or lower in value than the aggregate parallel value of the stripes in order to reduce Y-axis pin cushion. A greater number of stripes would generally mean a higher resistance per stripe to achieve the same effect, the pin cushion being related to the total bridging resistance between stripes, the bridging resistance being the parallel equivalent value of the stripes. Stripes located towards the center of the bus-bars have a disproportionate effect on pin cushion.

Patterning of the element into bus-bars and stripes can be via vapor deposition using a suitable stencil to prevent unwanted areas of coating, or via silk screening to create the desired pattern, or via pad-printing, or via laser scribe or chemical etching or chemical reaction, or any other process which can create a patterned layer. In the case of conductive polymer Agfa Orgacon™, the pattern can be created by using sodium hypochlorite to force areas to become non-conductive via chemical reaction without actual material removal.

Fabrication can entail the use of normal touchscreen or touchpad methods such as vapor deposition of appropriate materials onto a glass sheet placed in front of a display.

In-mold decorating ("IMD") entails the use of a graphic sheet or layer placed inside the injection mold or cast prior to the introduction of fluid plastic. Once molded, the layer becomes an integral part of the resultant plastic piece. In the case of a 2DCT, a conductive element of the type according to the invention is placed in the mold for a display cover; when injected, the conductive layer becomes fused to one side of the cover. In this way complex cover shapes, including those having compound curves, can be created which include an integral 2DCT at extremely low cost.

Figure 16:
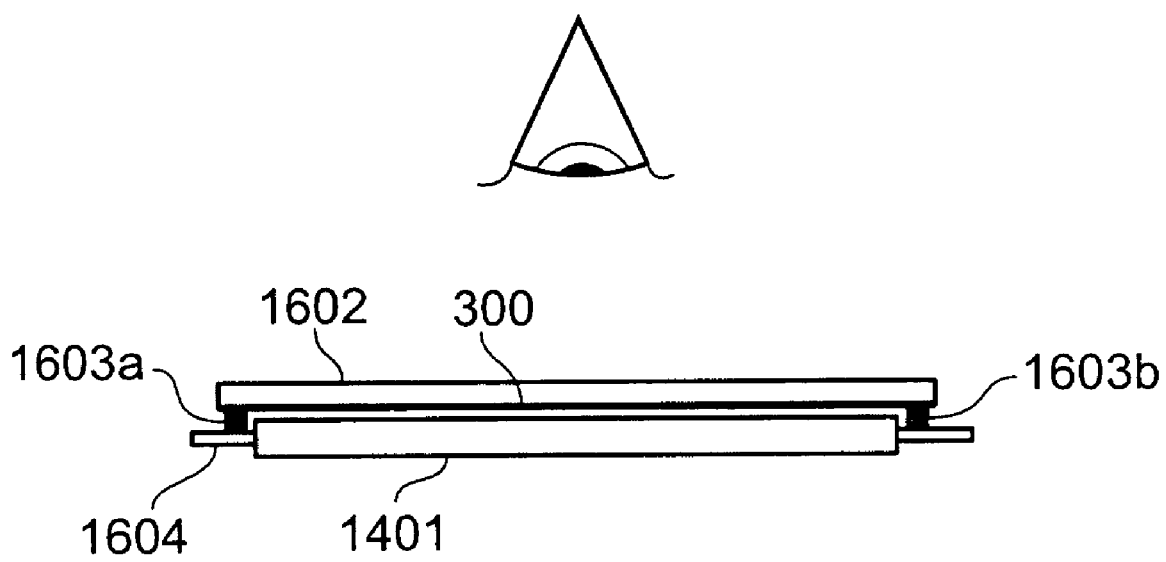
FIG. 16 schematically shows in vertical section a capacitive based position sensor according to an embodiment of the invention arranged over a liquid crystal display so as to create a touch-sensitive screen.

Electrode connections can be made via wires bonded to the corners, or via conductive rubber pillars, or using metal springs, etc. Conductive rubber is a method of choice for very low cost connection from an underlying PCB containing the driver circuitry. FIG. 16 shows such a construction method in cross-section. Display 1601 is viewed through cover lens 1602 and sensing element 300. Element 300 is connected via at least four corner electrodes through conductive rubber posts, of which two 1603a, 1603b are shown, to PCB 1604. The entire assembly is placed under compression via screws, clamps or other fastener system (not shown) so that the rubber posts are compressed and thus forced to make contact between PCB 1604 and element 300.

The element can also be fabricated from molecular substances having anisotropic conduction. For example, a conductive polymer can be envisioned having conductivity that is much better in one direction than another. Such materials based on nanostructures have been described in the literature, for example in literature from Helsinki University of Technology.

2DxT Stripe Weighting

One embodiment of the invention weights the stripes so that the ones near center-screen are either spaced further apart or have a higher resistance or both. The effect of this is to reduce the amount of inherent pin cushion. However, tests have shown that while this in fact is what happens, it also means that there will be a loss of signal in the center of the element, and/or there will be drive problems through the resultant higher resistance and lower finger coupling to neighboring traces. In practice this approach is not deemed to be efficacious, and is mentioned here only for completeness.

2DCT Acquisition Manipulation

Problems associated with 2DCT's include interference from outside electrostatic or radio sources having a frequency at the operating frequency of the element, or some harmonic thereof. These problems can be attenuated by using a modulated operating frequency for the signal acquisition so as to reduce or prevent signal-noise aliasing or beating. This can involve the use of frequency hopping, chirps, or pseudo-random frequency modulation. These methods are known as 'spread-spectrum' modulation.

Post processing can include the use of majority vote filtering, median filtering, averaging, and so on to reduce the residual effects of noise that are already attenuated by means of the frequency modulation.

Low frequency interference can be caused by local mains fields and so on. This form of interference can be attenuated by synchronizing the acquisition to the interfering source, for example 50 or 60 Hz, as described in the datasheet for the Quantum Research Group Ltd (UK) QT310 device.

2DCT Driven Shield

The element is compatible with driven shield methods to reduce interference from LCD displays, VFD switching, etc. This entails the use of a conductive plane behind the element positioned between the element and the interfering source. A drive shield can also protect against signal disturbance from motion behind the element. Driven back-shields are commonly used in the construction of 2DCT's.

2DCT Wake-Up

In many applications it is desirable to have a 'wakeup' function, whereby the entire device 'sleeps' or is in some quiescent or background state. In such cases, it is often desirable to have a wake signal from mere proximity of a human body part some distance away.

The element can be driven as a single large capacitive electrode without regard to position location, while the unit is in the background state. During this state the electronic driver logic looks for a very small change in signal, not necessarily enough to process as a 2D coordinate, but enough to determine that an object or human is in proximity. The electronics then 'wakes up' the overall system and the element is driven so as to become a true 2DCT once again.

Tablet, Mouse Pad Usage; Injection Mode

The element of the invention in 2DCT mode is suitable as a mouse pad, or as a tablet type input device. In these roles, there is no need for optical transparency. A stylus can be used with the element either to pick up a radiated electric field from the element, or to inject a signal into the element, or to act as a human finger.

In injection mode, the element of the invention merely operates in reverse. A signal from a tethered pen is injected capacitively into the element in a region surrounding the point of contact. The signal is then apportioned ratiometrically to the four corner electrodes, from whence it can be picked up and conveyed to a measurement circuit of almost any type already described in literature and then processed to create an indicative result. The pin cushion result operates in substantially the same way in injection mode as it does in a 2DRT or 2DCT mode; the vector gradients are the same.

2DxT Uncorrected Mode

Many applications do not require linearization of the result. These are principally those applications involving human interfaces of low resolution, for example for menu button sensing and the like. In such applications, the element and related signal acquisition circuitry can dispense with the linearization step and simply generate the raw output. Additional system logic would interpret 2D coordinate boundaries as being touch buttons, the boundaries being defined at the time of software development.

If the ratio of stripe-to-bus-bar resistance is high enough, the accuracy of the raw processed result may be acceptable for direct use. For example, if the resulting coordinate error of an element is only 5% but is repeatable, the element may be perfectly suitable for uncorrected menu button detection over a display where the buttons do not occupy less than 10% of the height of the element. If the buttons are principally located near the horizontal centerline of the element, or along the left or right sides, the distortion could be negligible and if so, no linearization correction need be applied.

FURTHER EXAMPLES

Figure 17:
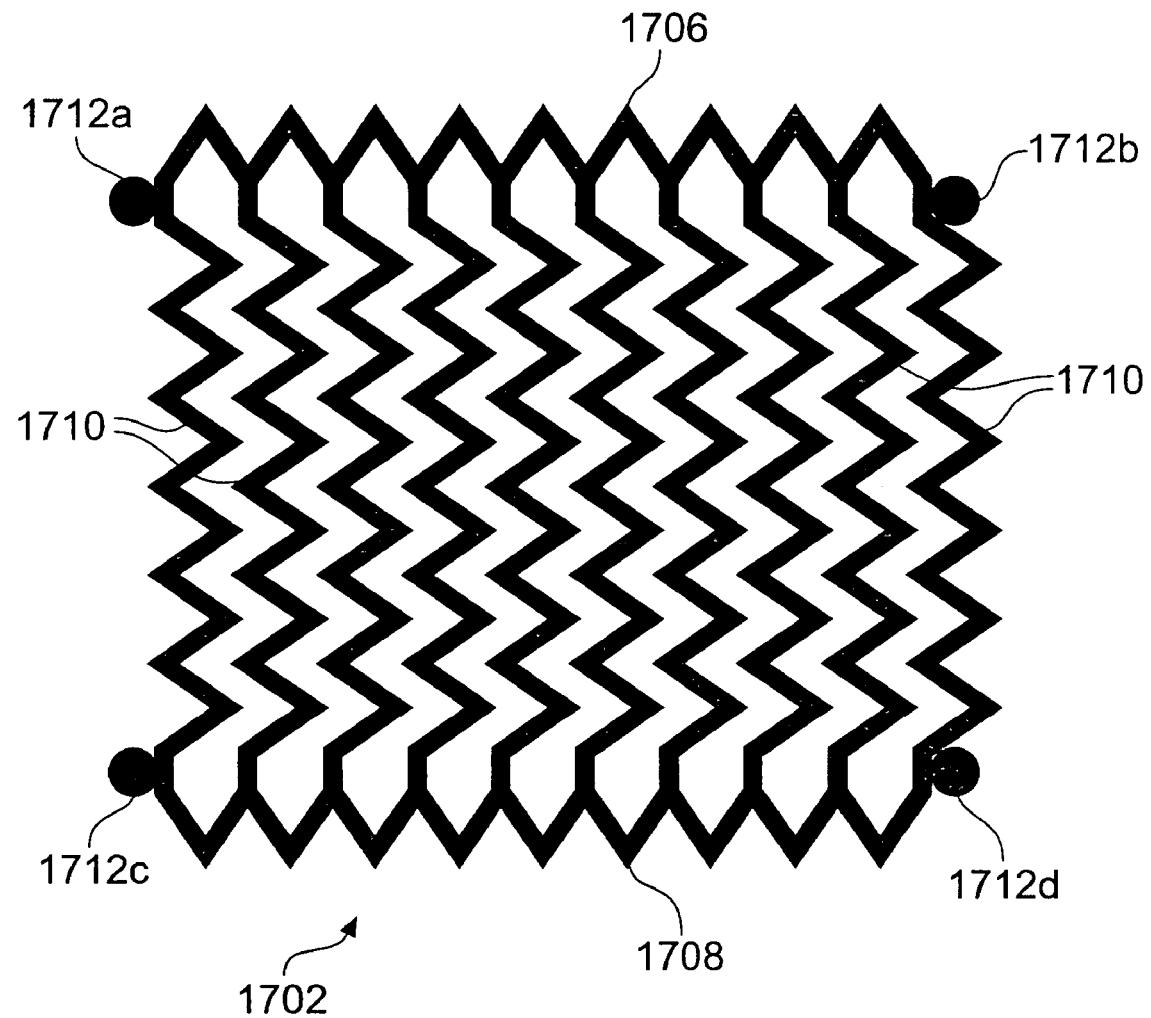
FIGS. 17 to 19 schematically shows two-dimensional patterns representative of the conductive material used to form sensing elements according to further embodiments of the invention.

FIG. 17 schematically shows a pattern of conductive material used in a sensing element 1702 according to another embodiment of the invention. The pattern differs from the pattern shown in FIG. 3 in that the conductive material of the sensing element shown in FIG. 17 is arranged in a zig-zag pattern. The sensing element 1702 is otherwise similar to and may be operated in the same manner as the sensing element shown in FIG. 3. Thus the sensing element 1702 comprises a pair of spaced apart bus bars 1706, 1708 formed from conductive material arranged in a zig-zag pattern with a series of similarly zig-zagged stripes 1710 (also known as strips) connecting between them to provide the anisotropic conductive area. Electrodes 1712$a$-$d$ (which are similar to and will be understood from the electrodes 301-304 shown in FIG. 3) are provided at the corners of the pattern of conductive material.

By depositing (or etching) zig-zag patterns of the kind shown in FIG. 17, the effective resistance per unit length of the bus bars and stripes can be increased. This can be particularly useful in smaller screen where the resistance of the bus bars and/or stripes may otherwise be undesirably low. Triangular zig-zagging such as shown in FIG. 17 is only one example of suitable patterning. Other patterns in which the integrated length of conductive material along at least a section of the bus bars and/or stripes connecting between two points is longer than the straight-line distance between the points could also be used. For example square zig-zagging or a sinusoidal patterning (e.g. similar to rounded triangle zig-zagging) could be used to provide the same effect.

Figure 18:
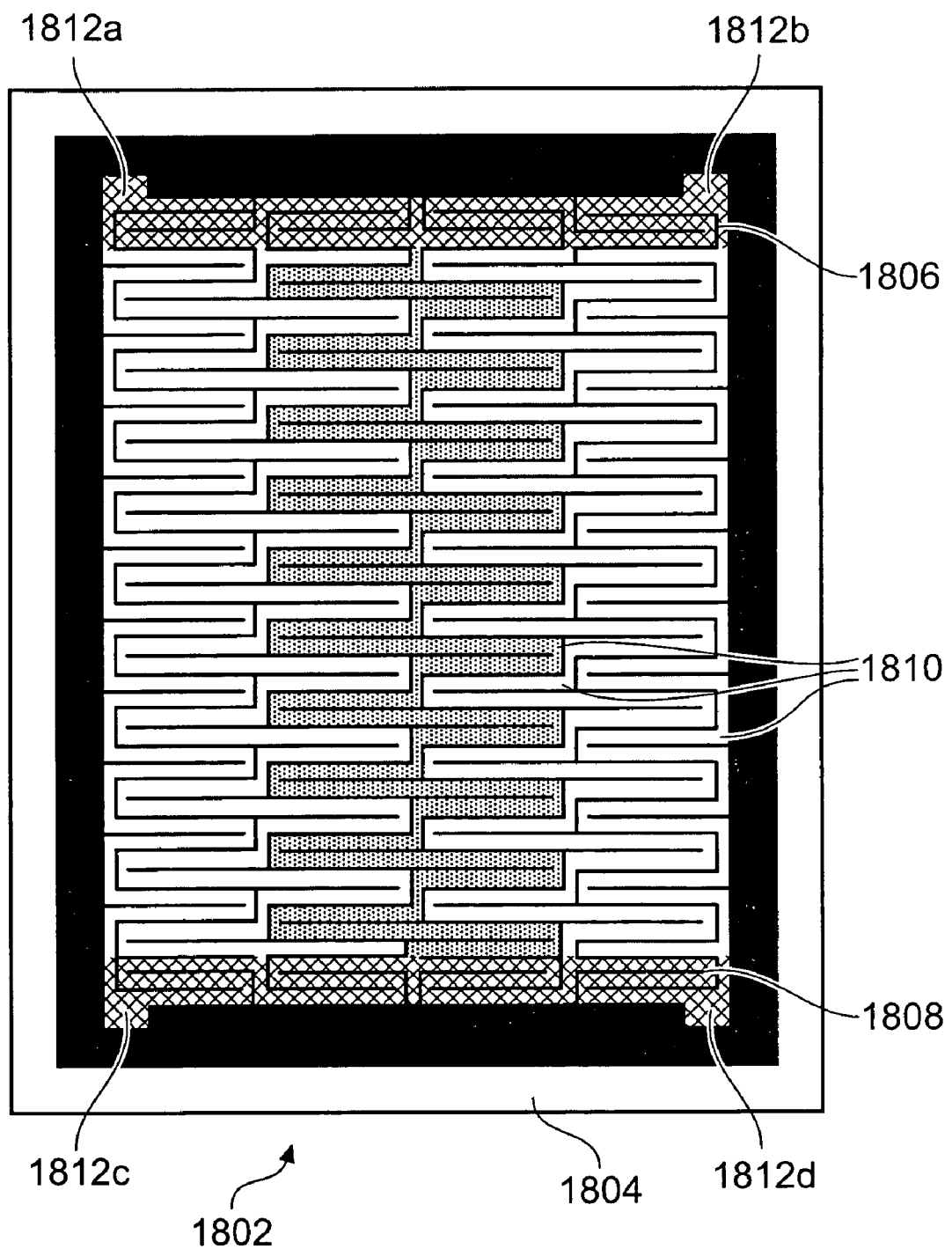

FIG. 18 schematically shows a pattern of conductive material used in a sensing element 1802 according to another embodiment of the invention. The pattern shown in FIG. 18 is similar to and will be understood from the pattern shown in FIG. 17 in that it employs a form of zig-zagging to increase the resistance provided by the bus bars and stripes between two points on the sensing element. However, although the sensing element 1802 operates in fundamentally the same way, the specific patterning is different with the more open triangular zig-zag pattern of FIG. 17 replaced with an more closely packed and interleaved square zig-zag pattern in which the resistive paths double-back on themselves several times. Also, whereas the anisotropic conducting area of the sensing element 1702 of FIG. 17 is provided by ten stripes, the anisotropic conducting area in the example shown in FIG. 18 is provided by five stripes 1810. In FIG. 18 (unlike FIG. 17) the conductive material is shown white and the non-conducting regions which separate the stripes is shown in black.

The sensing element 1802 comprises a pair of spaced apart bus bars 1806, 1808. The pattern of conductive material is such that the bus bars regularly double-back on themselves to increase their effective resistive lengths. With the arrangement shown in FIG. 18, the resistive length of the bus bars is around three times longer than the distance they span on the sensing element. By doubling-back in this way, e.g. as opposed to simply employing thinner (and hence more resistive) straight line resistive paths, increased resistance can be provided without significantly reducing the overall surface area of the electrodes for coupling to an object whose position is to be determined. The regions of the conductive material corresponding to the bus bars 1806, 1808 are identified in FIG. 18 by cross-hatching.

The five stripes 1810 connecting between the bus bars 1806, 1808 to provide the anisotropic conductive area are similarly arranged to double-back on themselves. Thus the path length of the stripes is significantly longer than the straight-line distance between the bus bars. The central stripe 1810 is shown shaded in FIG. 18. The stripes either side of the central stripe are arranged to follow a similarly shaped pattern to the central stripe. However, these adjoining stripes are slightly offset in a direction perpendicular to the bus bars 1806, 1808 so that the stripe patterns may be interweaved/interleaved with one another. The outer stripes are of different shape in that they follow and interleave with their respective adjoining stripes on one side, but the doubling back is curtailed on the outer side of the sensing element to provide a flat edge.

The interdigitation of neighboring stripes provided by the interleaving patterning in FIG. 18 can help provide a more uniform response to position as it provides for more distributative coupling between an object whose position is to be sensed and different ones of the stripes 1810 and so helps to reduce apparent "cogging" as an object moved from being over one stripe to being over another.

As in the other embodiments, electrodes 1812*a-d* are provided at the corners of the pattern of conductive material to allow for position determination as described above. However, the sensing element 1802 shown in FIG. 18 further includes an additional guard electrode 1804. The guard electrode 1804 may be formed of the same material and in the same way and at the same time as the conductive material providing the resistive bus bars and the anisotropically conducting area. Similar guard electrodes may be employed with the other embodiments of the invention described above. The guard electrode 1804 can be particularly beneficial for capacitive based position sensors as it can be coupled to capacitance measurement circuitry similar to the capacitance measurement circuitry coupled to the corner electrodes 1812*a-d* and used to provide a reference signal. The reference signal from the guard electrode 1804 can be used to provide a moving offset measurement for the corner electrodes. Thus changes in the measured signals from the corner electrodes attributable to environmental conditions, as opposed to the presence of an object whose position is to be sensed, can be more readily accounted for.

Furthermore, signals from the guard electrode 1804 may be used to govern the way in which a device operated by position estimates from the sensing element responds to activation of the sensing element. For example, the device may be configured to ignore (or not to make) position estimates if the signal from the guard electrode indicates a strong degree of capacitive coupling to an object. This kind of "locking" can be useful to prevent unintentional activation of the device. For example, the position sensing element may be used in a mobile telephone (cellular telephone) in which different region of the sensing area corresponding to the different buttons of a numeric keypad. In this case, when a user holds the telephone in his hand and presses areas of the sensing element corresponding to the numeric buttons to dial a number, the position sensor responds normally. However, when the user holds the telephone against his head, the relatively large area guard electrode is provided with a large degree of capacitive coupling due to the close proximity of the user's head so that a positive detection signal from the guard electrode is obtained. This signal can be used to inhibit the position sensing part of the sensing element so that numbers on the keypad are not accidentally activated, e.g. by brushing against the users' ear while the telephone is adjacent his head.

Figure 19:
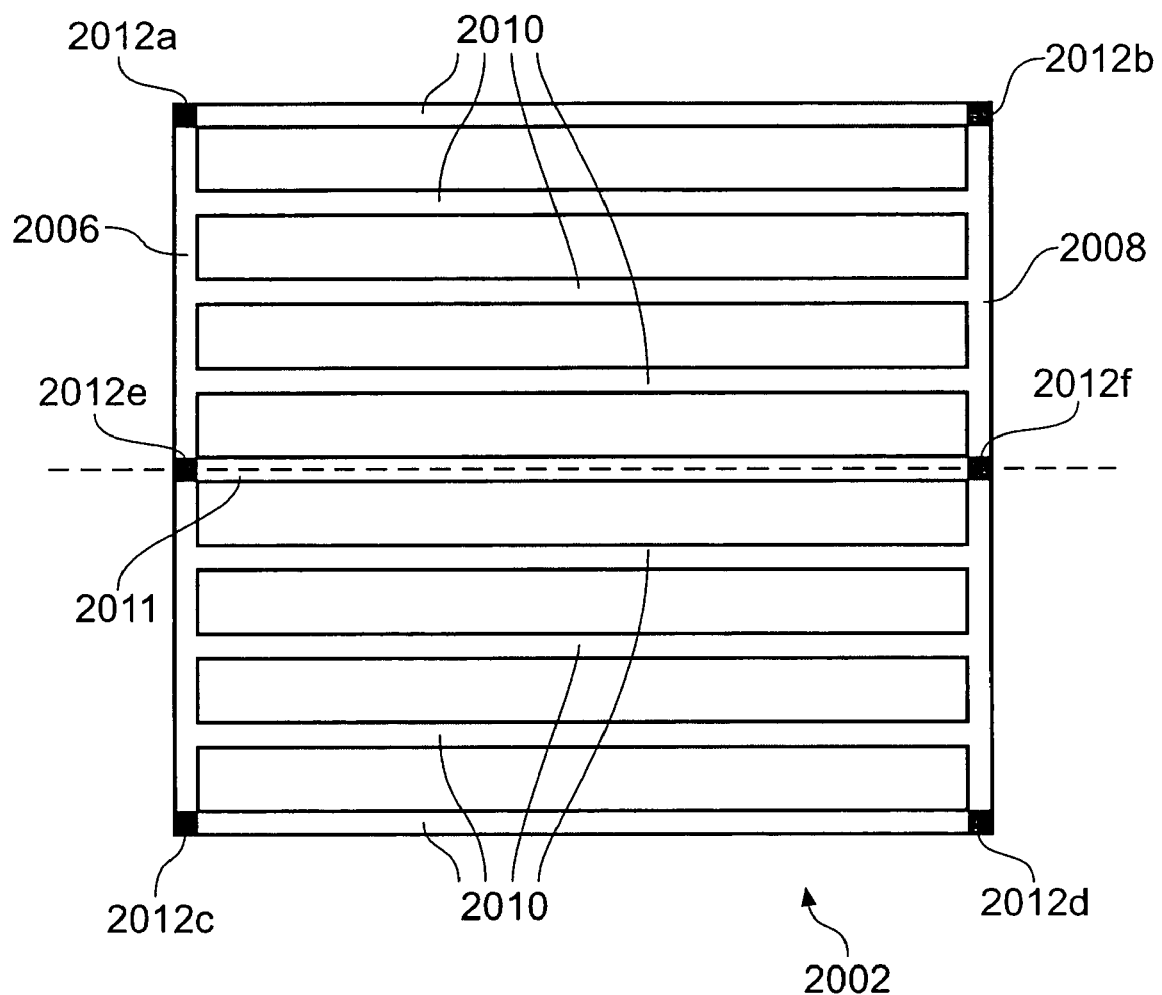

FIG. 19 schematically shows a pattern of conductive material used in a sensing element 2002 according to another embodiment of the invention. The pattern is similar to that of FIG. 3, although it includes nine stripes 2010, 2011 instead of 10. Furthermore, the sensing element 2002 of FIG. 19 is shown in an orientation that is rotated by 90 degrees compared to that of FIG. 3. Thus the sensing element 2002 of FIG. 19 comprises a pair of spaced apart bus bars 2006, 2008 formed from conductive material and a series of nine stripes 2010, 2011 connecting between the bus bars to provide an anisotropic conductive area. Electrodes 2012*a-d* are provided at the corners of the pattern of conductive material as in FIG. 3. However, two further electrodes 2012*e*, 2012*f* are provided midway along respective ones of the bus bars 2006, 2008. The electrodes may be coupled to drive channels similar to those coupled to the other electrodes to provide a further pair of output signals. As in the other embodiments, the various drive channels may be provided by separate drive circuits or by appropriate multiplexing of a single drive circuit.

Thus the sensing element 2002 shown in FIG. 19 may in effect be considered as comprising two sensing elements which are adjacent one another and share a common stripe between their respective bus bars and a common pair of electrodes at the ends of their common stripe. That is to say the sensing element 2002 may be considered to comprise a lower sensing element corresponding to the lower half of the sensing element 2002 (below the imaginary dashed line in FIG. 19) and an upper sensing element corresponding to the upper half of the sensing element 2002 (above the imaginary dashed line in FIG. 19).

The lower sensing element is cornered by the four electrodes labelled 2012*e*, 2012*f*, 2012*c* and 2012*d*. The section of the bus bar 2006 which lies between the electrodes labelled 2012*e* and 2012*c* provides one bus bar for the lower sensing element, and the section of the bus bar 2008 which lies between the electrodes labelled 2012*f* and 2012*d* provides another bus bar for the lower sensing element. The central stripe 2011 and the other of the stripes 2010 below it provide the stripes of the lower sensing element. Output signals from drive channels associated with the four electrodes labelled 2012e, 2012f, 2012c and 2012d may be used to determine position within the lower sensing element.

The upper sensing element is cornered by the four electrodes labelled 2012a, 2012b, 2012e and 2012f. The section of the bus bar 2006 which lies between the electrodes labelled 2012a and 2012e provides one bus bar for the upper sensing element, and the section of the bus bar 2008 which lies between the electrodes labelled 2012b and 2012f provides another bus bar for the upper sensing element. The central stripe 2011 and the other of the stripes 2010 above it provide the stripes of the above sensing element. Output signals from drive channels associated with the four electrodes labelled 2012a, 2012b, 2012e and 2012f may be used to determine position within the upper sensing element.

Position estimates derived from the upper and lower sensing elements separately can be used to give an indication of the distribution of the coupling of an object to the sensing element. For example, significant coupling to both the upper and lower sensing elements may indicate a significant degree of handshadow is present.

Figure 20:
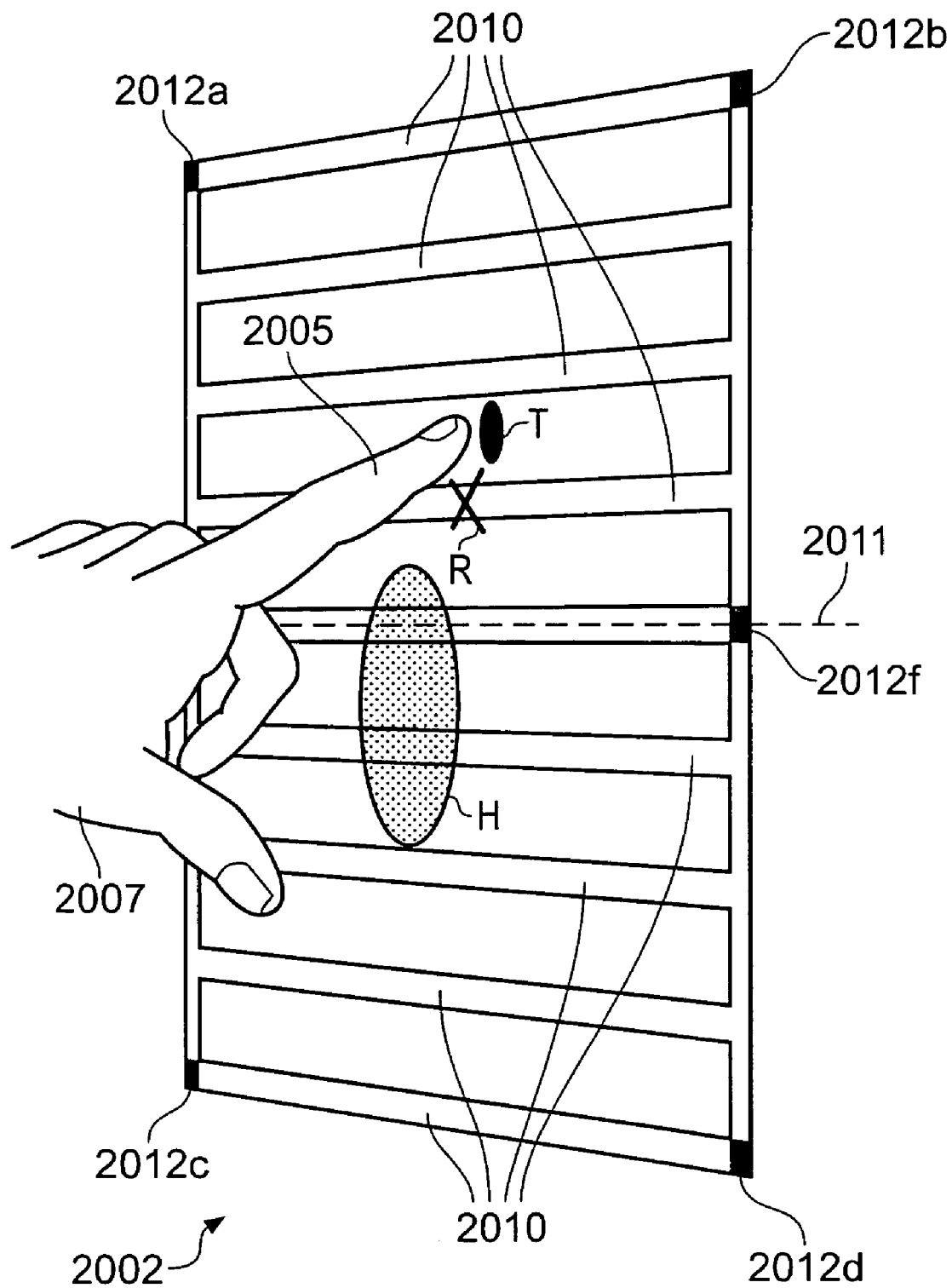
FIG. 20 schematically shows a sensing element incorporating the resistive pattern of FIG. 19 when in use.

FIG. 20 schematically shows the sensing element 2002 of FIG. 19 being used to detect the position of a finger 2005 associated with a hand 2007 in a situation where there is significant handshadow. The user intends to indicate a position beneath his finger, i.e. in the region of strong capacitive coupling indicated in FIG. 20 by the letter T. However, the user's hand also presents a larger area of less strong (because it is further away) capacitive coupling marked in FIG. 20 by the letter H. If the position of the touch is calculated solely from the signals from the four corner electrodes 2012a, b, c and d, the inherent interpolation provided by the sensing element will lead to an output result which represents the centroid of the coupling regions T and H, which might, for example, be the point indicated by the letter R. However, by taking account of the signals associated with the further electrodes 2012e (obscured by hand in FIG. 20) and 2012f, separate position estimates can be derived from the upper and lower halves of the sensing element 2002.

Thus the signal from the upper half of the sensing element 2002 can be used to provide an estimate of position which is not effected by the capacitive coupling associated with the hand 2007 since this is primarily to the lower half of the sensing element. In general, if the orientation of the sensing element in use is such that a user's hand will normally approach it as shown in FIG. 20, if there is significant coupling to both the top and bottom halves of the sensing element 2002, the user's finger might be assumed to be in the top half, and his hand in the bottom half. In effect, the lower stripes are absorbing the effect of the handshadow to prevent mixing of the signals associated with the user's hand with those associated with his finger. If, there is only significant coupling to the bottom half, the user's finger might be assumed to be in the bottom half, the remainder of his hand being below this and so outside the sensitive area of the sensing element.

Accordingly, the arrangement is in effect the same, and provides the same benefits (e.g. rejection of handshadow signals), as the arrangement shown in FIG. 9 but is based on sharing a common edge stripe and its associated electrodes as opposed to a common bus bar and its associated electrodes. The inventors have found that the arrangement shown in FIG. 19 can lead to improved handshadow rejection over the arrangement shown in FIG. 9.

Figure 21:
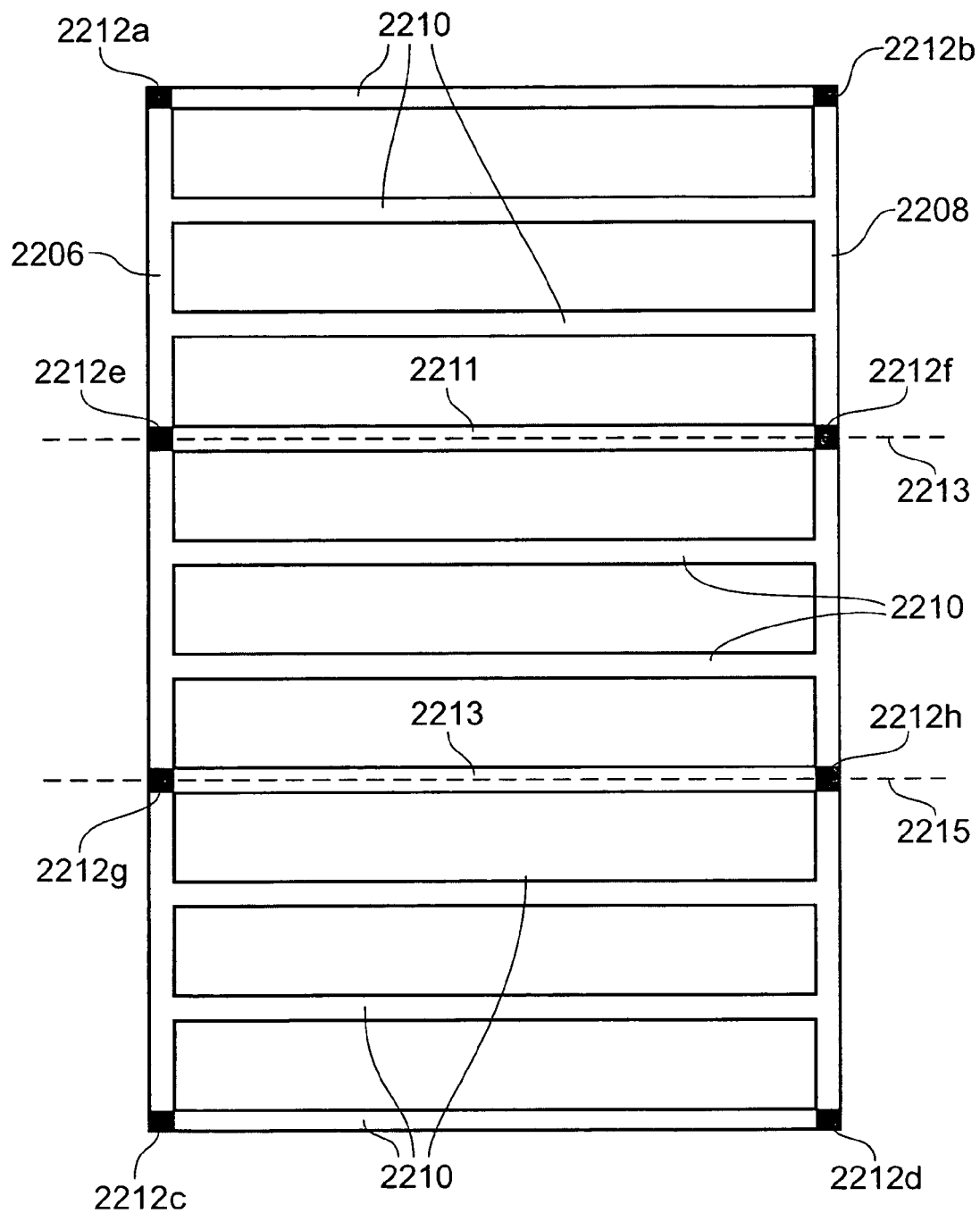
FIG. 21 schematically shows a two-dimensional patterns representative of the conductive material used to form a sensing element according to another embodiment of the invention.

FIG. 21 schematically shows a pattern of conductive material used in a sensing element 2202 according to another embodiment of the invention. The pattern in similar to that of FIG. 3 but is shown in an orientation that is rotated by 90 degrees compared to that of FIG. 3. Thus the sensing element 2202 of FIG. 19 comprises a pair of spaced apart bus bars 2206, 2208 formed from conductive material and a series of ten stripes 2210, 2211, 2213 connecting between the bus bars to provide an anisotropic conductive area. Electrodes 2212a-d are provided at the corners of the pattern of conductive material as in FIG. 3. However, four further electrodes 2212e, 2212f, 2212g, 2212h are provided as pairs along respective ones of the bus bars 2206, 2208. These further electrodes may again be coupled to drive channels similar to those coupled to the other electrodes to provide a further four output signals. As in the other embodiments, the various drive channels may be provided by separate drive circuits or by appropriate multiplexing of a single drive circuit.

Thus the sensing element 2202 shown in FIG. 19 may in effect be considered as comprising three sensing elements. That is to say the sensing element 2202 may be considered to comprise a lower sensing element corresponding to the lower third of the sensing element 2202 (below the lower imaginary dashed line 2215 in FIG. 19), a middle sensing element corresponding to the middle third of the sensing element 2202 (between the imaginary dashed lines 2213, 2215 in FIG. 19), and an upper sensing element corresponding to the upper third of the sensing element 2202 (above the imaginary dashed line 2213 in FIG. 19).

The lower sensing element is cornered by the four electrodes labelled 2212g, 2212h, 2212c and 2212d. The section of the bus bar 2206 which lies between the electrodes labelled 2212g and 2212c provides one bus bar for the lower sensing element, and the section of the bus bar 2208 which lies between the electrodes labelled 2212h and 2212d provides another bus bar for the lower sensing element. The stripe 2213 and the other of the stripes 2210 below it provide the stripes of the lower sensing element. Output signals from drive channels associated with the four electrodes labelled 2012g, 2012h, 2012c and 2012d may be used to determine position within the lower sensing element.

The middle sensing element is cornered by the four electrodes labelled 2212e, 2212f, 2212g and 2212h and the upper sensing element is sensing element is cornered by the four electrodes labelled 2212a, 2212b, 2212e and 2212f. Output signals from the drive channels associated with these electrodes may be used to determine position respectively within the middle and upper sensing element.

Thus the use of eight electrodes as shown in FIG. 21 allows position estimates to be derived from the upper, middle and lower sensing elements. These can be used to give an indication of the distribution of the coupling of an object to the sensing element in the same way as described above. However, by providing three, as opposed to two, position estimates, a better measure of the distribution of the coupling is provided and so more reliable handshadow rejection can be provided.

Still more electrodes could be used so as to in effect divide the sensing element up into more sections, e.g., ten electrodes may be used to divide it into four section, twelve electrode for five sections, and so on.

Features of the other embodiments, such as the zig-zagging, interleaving/interweaving and guard electrodes of FIGS. 17 and 18, could also be used with the sensing element of FIG. 19.

Summary

The invention is at its basic reduction, an element whose purpose is to provide for an improved form of 2D sensing device via anisotropic conduction, plus, optionally, a method to correct the distortions of the raw computed coordinate result. The mode of operation (including but without limitation, galvanic or capacitive modes), the use to which it is put, and whether it is used as a receiver of signals from a stylus or a sensor of passive touch is not of prime importance to the invention. What is important is the anisotropic structure of the element and the form of positional error it produces, and the optional methods disclosed herein for correcting the error.

An important aspect of sensing elements of embodiments of the invention is that they can be made as a single-layer having a core that conducts well galvanically in a first predetermined direction, but suppresses conduction in a second direction orthogonal to the first, i.e. it has anisotropic conductivity, plus, the core is bounded by a resistive border to make the whole element. The element furthermore has four electrodes in the corners and which are driven and/or sensed by an electronic circuit to create a resulting output indicative of touch position.

There are many variations possible as will become evident to those skilled in the art, involving various combinations of detection methods or switch sequences outlined specifically herein. The methods disclosed herein can be combined with other methods as taught in any number of my prior patents including methods for drift compensation, calibration, moisture suppression using short switch closure times, and the like. Particular note should be made of the various possible combinations of features disclosed in my own prior art involving capacitive sensing methods, all of which are incorporated herein by reference; also note the capacitive products as described in the datasheets of Quantum Research Group Ltd (UK), many of which have features germane to the instant invention.

It is also possible to warp the invention into unusual shapes as disclosed by Pepper. Such transformations may prove useful in object position sensing for example in industrial settings, where location along a cylinder, sphere, or other curved surface might be important.

It will be appreciated that although particular embodiments of the invention have been described, many modifications/additions and/or substitutions may be made within the spirit and scope of the present invention.

What is claimed is:

1. A touch sensitive position sensor comprising:
a substrate defining a touch sensitive platform:
first and second resistive bus-bars arranged spaced apart on the substrate; and
an anisotropic conductive area having non-zero resistance arranged between the bus-bars such that currents induced in the anisotropic conductive area flow preferentially towards the bus-bars,
a first electrode;
a second electrode, wherein the first resistive bus-bar extends between the first and the second electrode;
a third electrode;
a fourth electrode, wherein the second resistive bus-bar extends between the third and the fourth electrode;
first, second, third and fourth drive channels associated with respective ones of the first, second, third and fourth electrodes, each drive channel being operable to generate an output signal dependent on the resistance between its electrode and the position of the object;
a fifth electrode coupled to the first resistive bus-bar at a location between the first and second electrodes;
a sixth electrode coupled to the second resistive bus-bar at a location between the third and fourth electrodes;
fifth and sixth drive channels respectively associated with the fifth and sixth electrodes, wherein the fifth and six drive channels are operable to generate output signals dependent on the resistance between their respective electrode and the position of the object; and
a processor operable to generate an estimate for the position of the object by comparing the output signals from the fifth and sixth drive channels and the output signals from a selected pair of the output signals from either the first and second drive channels or the third and fourth drive channels.

2. A touch sensitive position sensor according to claim 1, wherein the processor is configured to estimate the position of the object in a first direction running between the bus-bars from a ratiometric analysis of the sum of the signals associated with the fifth and sixth electrodes and the sum of the signals associated with the selected pair of the other output signals.

3. A touch sensitive position sensor according to claim 1, wherein the processor is configured to estimate the position of the object in a second direction running along the bus-bars from a ratiometric analysis of the sum of the signals associated with the fifth and the one of the selected pair of the other output signals associated with the first resistive bus bar, and the sum of the signals associated with the sixth and the one of the selected pair of the other output signals associated with the second resistive bus bar.

4. A touch sensitive position sensor comprising:
a substrate defining a touch sensitive platform:
first and second resistive bus-bars arranged spaced apart on the substrate; and
an anisotropic conductive area having non-zero resistance arranged between the bus-bars such that currents induced in the anisotropic conductive area flow preferentially towards the bus-bars guard electrode adjacent to the bus bars and/or the anisotropic conducting area, wherein the guard electrode at least partially surrounds the bus bars and the anisotropic conducting area;
a first electrode;
a second electrode, wherein the first resistive bus-bar extends between the first and the second electrode;
a third electrode;
a fourth electrode, wherein the second resistive bus-bar extends between the third and the fourth electrode;
a guard drive channel associated with the guard electrode, the guard drive channel being operable to generate a guard electrode output signal indicative of a coupling between an object and the guard electrode; and
a processor operable to compare the output signal from the guard electrode with the output signals from at least one of the other electrodes to compensate for changes in the output signal from the at least one of the other electrodes which are not associated with an object whose position is to be determined.

5. A touch sensitive position sensor according to claim 4, wherein the processor is operable to disregard output signals from the electrodes coupled to the resistive bus bars according to the output signal from the guard electrode.

6. A touch sensitive position sensor comprising:
a substrate defining a touch sensitive platform:
a first resistive bus-bar on the substrate;
a second resistive bus-bar spaced apart from the first resistive bus-bar on the substrate;
an anisotropic conductive area having non-zero resistance arranged between the first and second bus-bars such that currents induced in the anisotropic conductive area flow preferentially towards the first and second bus-bars, wherein the anisotropic conductive area includes a plurality of resistive strips that extend between the first resistive bus-bar and the second resistive bus-bar wherein the resistance of the resistive strips is at least five times greater than the resistance of the first and second resistive bus-bars;

first, second, third and fourth drive channels associated with respective ones of a first and second electrode at ends of the first resistive bus-bar and a third and fourth electrode at ends of the second resistive bus-bar, each drive channel being operable to generate an output signal dependent on the resistance between its electrode and the position of an object touching the sensor; and a processor operable to compare the output signal from each electrode with the output signals from the other electrodes and compensate for changes in the output signal from the other electrodes which are not associated with an object whose position is to be determined.

7. A touch sensitive position sensor according to claim 6, wherein the first and second resistive bus-bars have a resistance between 1000 ohms and 50,000 ohms.

8. A touch sensitive position sensor according to claim 6, wherein there are at least nine resistive strips that extend between the first resistive bus-bar and the second resistive bus-bar.

9. A touch sensitive position sensor comprising:

a substrate defining a touch sensitive platform;

a first resistive bus-bar on the substrate having first and second electrodes at respective ends of the first resistive bus-bar;

a second resistive bus-bar spaced apart from the first resistive bus-bar on the substrate having a third and fourth electrodes at respective ends of the second resistive bus-bar;

a plurality of resistive strips that extend between the first resistive bus-bar and the second resistive bus-bar wherein the resistance of the resistive strips is greater than the resistance of the first and second resistive bus-bars to limit pin cushion effects and form an anisotropic conductive area; and first, second, third and fourth drive channels associated with respective ones of a first and second electrode at ends of the first resistive bus-bar and a third and fourth electrode at ends of the second resistive bus-bar, each drive channel being operable to generate an output signal dependent on the resistance between its electrode and the position of an object touching the sensor such that non-linear effects are constrained to one dimension.

10. A touch sensitive position sensor according to claim 9, wherein the resistance of the resistive strips is five to ten times greater than the resistance of the first and second resistive bus-bars.

* * * * *